US012776595B2

(12) United States Patent
Nathan et al.

(10) Patent No.: US 12,776,595 B2
(45) Date of Patent: Oct. 27, 2026

(54) WIRELESS TRANSCEIVER

(71) Applicant: Visban, Co., Ltd., Tokyo (JP)

(72) Inventors: Arokia Nathan, Hertfordshire (GB); Suk-Bae Cha, Tokyo (JP); Ryosuke Kuwada, Kanagawaken (JP)

(73) Assignee: Visban, Co., Ltd., Tokyo (JP)

( * ) Notice: Subject to any disclaimer, the term of this patent is extended or adjusted under 35 U.S.C. 154(b) by 143 days.

(21) Appl. No.: 18/272,825

(22) PCT Filed: Jan. 21, 2022

(86) PCT No.: PCT/GB2022/000008

§ 371 (c)(1),
(2) Date: Jul. 18, 2023

(87) PCT Pub. No.: WO2022/157479

PCT Pub. Date: Jul. 28, 2022

(65) Prior Publication Data

US 2024/0266760 A1 Aug. 8, 2024

(30) Foreign Application Priority Data

Jan. 22, 2021 (GB) ...................................... 2100882
Jun. 28, 2021 (GB) ...................................... 2109263

(51) Int. Cl.
*H01Q 25/00* (2006.01)
*H01Q 13/02* (2006.01)
*H01Q 13/08* (2006.01)

(52) U.S. Cl.
CPC ........... *H01Q 25/005* (2013.01); *H01Q 13/02* (2013.01); *H01Q 13/08* (2013.01)

(58) Field of Classification Search
CPC ...... H01Q 25/005; H01Q 13/02; H01Q 13/08; H01Q 1/02; H01Q 1/1271; H01Q 1/364;
(Continued)

(56) References Cited

U.S. PATENT DOCUMENTS 8,892,048 B1 11/2014 Turner
2002/0132581 A1 9/2002 Ichihara
(Continued)

FOREIGN PATENT DOCUMENTS

CN 110768016 A 2/2020
CN 111342222 A 6/2020
(Continued)

OTHER PUBLICATIONS

ISA/EP; International Search Report and Written Opinion for International Patent Application No. PCT/GB2022/000008 dated Jun. 14, 2022, 21 pages.

(Continued)

*Primary Examiner* — Eugene Yun
(74) *Attorney, Agent, or Firm* — Lowenstein Sandler LLP

(57) ABSTRACT

A wireless transceiver (1) includes a planar substrate (2) having first (3) and second (4) opposite faces and having a thickness between the first (2) and second (3) opposite faces. The wireless transceiver (1) also includes a number of first antennae ($Rx_1, \ldots, Rx_N$) supported on the first face (3). The wireless transceiver (1) also includes a number of second antennae ($Tx_1, \ldots, Tx_M$) supported on the second face (4). The wireless transceiver (1) also includes a circuit (7) supported by the planar substrate (2) and connected to the first antennae ($Rx_1, \ldots, Rx_N$) and the second antennae ($Tx_1, \ldots, Tx_M$). The circuit (7) includes a number of vias (8) formed through the thickness of the planar substrate (2) for transmission of signals between the circuit (7) and the first antennae ($Rx_1, \ldots, Rx_N$) and/or between the circuit (7) and the second antennae ($Tx_1, \ldots, Tx_M$). The circuit (7) is configured to control the first antennae ($Rx_1, \ldots, Rx_N$) as a first phased array (5) to receive radio signals (9). The first phased array (5) is directional and controllably orientable within a first range of acute angles ($\theta_R$) to a normal (10) of (Continued)

the first face (3). The circuit (7) is also configured to control the second antennae ($Tx_1$, . . . , $Tx_M$) as a second phased array (6) to retransmit (11) the radio signals received using the first phased array (5). The second phased array (6) is directional and controllably orientable within a second range of acute angles ($\theta_T$) to a normal (12) of the second face (4).

16 Claims, 11 Drawing Sheets

(58) Field of Classification Search
CPC ...... H01Q 3/46; H01Q 21/062; H01Q 21/065; H01Q 3/26; H04B 7/15528; H04B 7/086; H04B 7/0617; H04B 7/155; H04B 7/06952; H04B 1/40; H04B 7/0682
USPC .............................................................. 455/7
See application file for complete search history.

(56) References Cited

U.S. PATENT DOCUMENTS

| | | | | |
|---|---|---|---|---|
| 2004/0110469 | A1 | 6/2004 | Judd et al. | |
| 2017/0250559 | A1* | 8/2017 | Narayanan | H02J 7/34 |
| 2018/0139626 | A1 | 5/2018 | Ashworth et al. | |
| 2019/0013580 | A1* | 1/2019 | Vigano | H01Q 3/2658 |
| 2019/0326668 | A1 | 10/2019 | Achour et al. | |
| 2020/0067593 | A1 | 2/2020 | Gharavi et al. | |
| 2020/0091990 | A1* | 3/2020 | Ho | H01Q 21/062 |
| 2020/0145093 | A1 | 5/2020 | Cheng et al. | |
| 2020/0336168 | A1 | 10/2020 | Hormis et al. | |
| 2020/0350980 | A1 | 11/2020 | Rofougaran | |

FOREIGN PATENT DOCUMENTS

| | | | |
|---|---|---|---|
| JP | 2005079944 | A | 3/2005 |
| JP | 2008160346 | A | 7/2008 |
| JP | 2017153352 | A | 8/2017 |
| JP | 2019087987 | A | 6/2019 |
| KR | 101005198 | A | 3/2010 |
| WO | 2020231763 | A1 | 11/2020 |

OTHER PUBLICATIONS

Intellectual Property Office; Examination Report for UK Patent Application No. GB2109263.0, dated Sep. 15, 2023, 5 pages.
Dataweek Electronics & Communications Technology, "Bits to beams: RF technology evolution for 5G millimetre-wave radio", Nov. 25, 2019, https://www.dataweek.co.za/8975R.
Rosu, Iulian, "Phase Shifters", YO3DAC / VA3IUL, 2018, http://www.qsl.net/va3iul/.
Wu, Qingqing, et al., "Intelligent Reflecting Surface-Aided Wireless Communications: A Tutorial", IEEE Transactions on Communications, May 2021, pp. 3313-3351, vol. 69, No. 5.
Search and Examination Report for Great Britain Patent Application Serial No. 2109263.0, dated Dec. 17, 2021, 15 pages.
Search and Examination Report for Great Britain Patent Application Serial No. 2109263.0, dated Jul. 31, 2024, 5 pages.
Search and Examination Report for Great Britain Patent Application Serial No. 2109263.0, dated Sep. 16, 2024, 7 pages.
Black, E et al, "Breaking Down mm Wave Barriers with Holographic Beam Forming", Feb. 12, 2020., http://www.microwavejournal.com/articles/33433-breaking-downmmwave-barriers-with-holographic-beam-forming, 12 pages.
Takahashi, Y et al., "Improving the Propagation Environment by Using Tunable Passive Repeater" Electronics Jul. 12, 2018, Jan. 25, 2018, https://www.mdpi.com/2079-9292/7/2/12, 11 pages.

* cited by examiner

WIRELESS TRANSCEIVER

CROSS REFERENCE TO RELATED APPLICATIONS

This application is a U.S. National Stage Application of International Patent Application No. PCT/GB2022/000008, filed on Jan. 21, 2022, which claims priority to United Kingdom Patent Application No. 2109263.0, filed on Jun. 28, 2021, and to United Kingdom Patent Application No. 2100882.6, filed on Jan. 22, 2021, the entire contents of all of which are incorporated by reference herein.

FIELD OF THE INVENTION

The present invention relates to wireless transceivers and methods for operating wireless transceivers, in particular wireless transceivers for radio signals with frequencies exceeding 5 GHz.

BACKGROUND

As wireless communications networks move towards higher frequencies to improve data rates, the corresponding decrease in wavelengths can lead to issues with providing uniform coverage in areas without line of sight to a transmitter, for example, in urban areas, forested areas, inside structures and so forth.

As wireless communications networks start to move to frequencies at and above 5 GHz (sometimes termed "fifth generation" or "5G"), the effects of attenuation by atmospheric gasses such as oxygen ($O_2$), carbon dioxide ($CO_2$) and water vapour ($H_2O$) can be significant in some frequency bands. Atmospheric weather effects can exacerbate such issues, for example attenuation may reach in the region of 60 $dB \cdot m^{-1}$.

Providing wireless network coverage to the interior of structures such as building and sports stadiums is already an issue for frequencies below 5 GHz. Moving to higher frequencies will cause further degradation of signal intensities penetrating into structures. Improvements in building glass relating to thermal regulation, for example inclusion of thin metallised layers to help keep buildings cooler, may further attenuate radio signals from the exterior.

CN 106992807 A describes a signal relay system for 5G communication. The system includes a downlink signal enhancement subsystem which includes a first receiving antenna, a first low noise amplifier module and a first transmitting antenna. The system also includes an uplink signal enhancement subsystem which includes a second receiving antenna, a second low noise amplifier module and a second transmitting antenna. The described signal relay system for 5G communication supports signal through-wall or through-glass. A 5G signal sent by a base station can be amplified and transmitted to an indoor wireless terminal, and a signal of the indoor wireless terminal can be amplified and uploaded to the base station.

US 2018/139521 A1 describes a transparent wireless bridge for providing access to an optical fiber network, including a first transceiver outside a building and configured to transmit/receive communication signals to and from the optical fiber network. A first glass sheet attached to an outer side of a window includes a first antenna communicatively coupled to the first transceiver and configured to transmit and receive communication signals to and from the first transceiver. A second glass sheet is attached to an inner side of the window and includes a second antenna configured to wirelessly transmit and receive communication signals to and from the first antenna. The wireless bridge also includes a second transceiver located inside the building that is communicatively coupled to the second antenna and configured to wirelessly transmit and receive data to and from the second antenna.

US 2015/380816 A1 describes an antenna control system and a method capable of consistently maintaining an optimum orientation point between a donor antenna and an adjacent base station. The antenna control system for receiving a signal from a base station includes a donor antenna including an antenna module disposed by being fixed to an inner side of a window glass and configured with an array antenna, a phase shifter including a plurality of transmission lines, and a phase controller configured to control the phase shifter to change an orientation direction of the antenna module. A repeater includes a measuring module for measuring a reception signal received by the antenna module. An analyzing module is for analyzing a signal quality parameter in each orientation direction of the antenna module based on a measurement result of the measuring module. A generating module is for generating an antenna control signal for controlling the orientation direction of the antenna module based on an analysis result of the analyzing module.

SUMMARY

According to a first aspect of the invention there is provided a wireless transceiver include a planar substrate having first and second opposite faces and having a thickness between the first and second opposite faces. The wireless transceiver also includes a number of first antennae supported on the first face. The wireless transceiver also includes a number of second antennae supported on the second face. The wireless transceiver also includes a circuit supported by the planar substrate and connected to the first antennae and the second antennae. The circuit includes a number of vias formed through the thickness of the planar substrate for transmission of signals between the circuit and the first antennae and/or between the circuit and the second antennae. The circuit is configured to control the first antennae as a first phased array to receive radio signals. The first phased array is directional and controllably orientable within a first range of acute angles to a normal of the first face. The circuit is also configured to control the second antennae as a second phased array to retransmit the radio signals received using the first phased array. The second phased array is directional and controllably orientable within a second range of acute angles to a normal of the second face.

The vias may be for interconnection of components of different functionality which may be layered and patterned into devices or heterogeneously integrated as discrete components.

The direction in which the first phased array is oriented may correspond to an axis of a principle radiation lobe of a first radiation pattern of the first phased array. The direction in which the second phased array is oriented may correspond to an axis of a principle radiation lobe of a second radiation pattern of the second phased array.

The first and second phased arrays may be controllably orientable in the sense that the directionally of the first and second phased arrays is not fixed, and may be independently varied in use by the circuit.

The circuit may be connected to the first antennae and the second antennae using physical, hard-wired links such as, for example, conductive traces, micro-strip lines, conductive vias and so forth.

Herein an acute angle means between 0 and 90 degrees, inclusive of 0 and 90 degrees. The first range of acute angles may include all, or less than all, of a first hemisphere directed away from the first face. In other words, the first range of acute angles need not include the entire first hemisphere. The second range of acute angles may include all, or less than all, of a second hemisphere directed away from the second face. The first and second hemispheres may in combination define a complete sphere.

The device may provide a base station of a wireless communication network. The device may provide a relay station of a wireless communication network. The device may provide a transceiver of a wireless communication network.

The planar substrate may be a flexible film or sheet.

The first antennae may be disposed directly on the first face. One or more dielectric layers may be disposed between the first antennae and the first face. The second antennae may be disposed directly on the second face. One or more dielectric layers may be disposed between the second antennae and the second face.

The first phased array may be controllably orientable in use to any angle within the first range. The first range may extend to encompass an entire hemisphere having a base parallel to the first face. However, the first range may encompass a range of angles which is less than a hemisphere. The first range may be less than or equal to 2π steradians, less than or equal to 3π/4 steradians, less than or equal to a steradians, or less than or equal to π/2 steradians. The first range may be substantially cone shaped. The first range may be substantially horn-shaped. The first range may be substantially fan-shaped.

The first phased array may be controllably orientable in use about first and/or second axes. The first and second axes may be orthogonal. The first and second axes may correspond, when the wireless transceiver is installed, to horizontal and vertical directions with respect to gravity. The first phased array may be controllably orientable in use about azimuthal and/or polar angles of a spherical polar coordinate system having a zenith oriented at an acute angle to the normal of the first face. The zenith need not be perpendicular to the first face. The zenith need not be parallel to the first face.

The second phased array may be controllably orientable in use to any angle within the second range. The second range may extend to encompass an entire hemisphere having a base parallel to the second face. However, the second range may encompass a range of angles which is less than a hemisphere. The second range may be less than or equal to 2π steradians, less than or equal to 3π/4 steradians, less than or equal to π steradians, or less than or equal to π/2 steradians. The second range may be substantially cone shaped. The second range may be substantially horn-shaped. The second range may be substantially fan-shaped.

The second phased array may be controllably orientable in use about second and/or second axes. The second and second axes may be orthogonal. The second and second axes may correspond, when the wireless transceiver is installed, to horizontal and vertical directions with respect to gravity. The second phased array may be controllably orientable in use about azimuthal and/or polar angles of a spherical polar coordinate system having a zenith oriented at an acute angle to the normal of the second face. The zenith need not be perpendicular to the second face. The zenith need not be parallel to the second face.

The circuit may include one or more components supported on the first face. The circuit may include one or more components supported on the second face.

The planar substrate may include, or take the form of, a laminate of two or more layers.

The circuit may include one or more components supported within the laminate planar substrate.

The planar substrate may be transparent. Transparent may correspond to the planar substrate having a minimum transmission of 50% for visible wavelengths. A portion of the wireless transceiver supporting the first and/or second antennae may be transparent or opaque.

The transparent planar substrate may include, or be formed from, glass. The transparent planar substrate may include, or take the form of, one or more plastics including but not limited to polycarbonate (PC), polyimide (PI), polyethylene terephthalate (PET), polyethylene naphthalate PEN, cyclo-olefin polymer (COP), or any other polymer having sufficient mechanical strength to support the circuit and sufficient transparency to be seen through.

The planar substrate may include, or take the form of, a laminate including one or more layers of glass and/or plastic and/or adhesive. The laminate may include one or more conductor layers. Conductor layers of the laminate may be internal (i.e. between the first and second faces), and/or external (i.e. supported on the first and/or second faces). One or more layers of the laminate may support one or more components of the circuit.

The circuit may include a first microstrip line supported on the first face and a second microstrip line support on the second face. The first and second microstrip lines may be connected by corresponding vias. Vias connecting between microstrip lines supported on the first and second faces may be impedance matched to the microstrip lines. The circuit may include a number of first microstrip lines supported on the first face. The circuit may include a number of second microstrip lines supported on the second face. Any microstrip line may be connected by vias extending through the planar substrate to one or more microstrip lines and/or other components of the circuit supported on the opposite side of the planar substrate.

Compared to, for example, radiative transfer or capacitive coupling between the first and second faces, such physical connections do not require that the planar substrate is formed from a material or materials having loss dielectric loss properties. Though not required, materials having loss dielectric loss properties may still be used.

The circuit may include one or more components flip-chip bonded to the planar substrate. One or more components of the circuit may be flip-chip bonded to the first face. One or more components of the circuit may be flip-chip bonded to the second face. One or more components of the circuit may be flip-chip bonded to the first face and one or more further components may be flip-chip bonded to the second face.

The one or more components may be flip-chip bonded to the planar substrate in accordance with the Heterogeneous Integration Roadmap, HIR. The Heterogeneous Integration Roadmap (HIR) is a set of guidelines developed for silicon systems-in-package (SiP) technologies. HIR may refer to, for example, the guidelines set out in the publication of the HIR 2019 edition. Although established for semiconductor/flat panel device fabrication using substrates for packaging semiconductor/flat panel devices, to the best of the inventor's knowledge the methods of the HIR have not previously been adapted to heterogeneous integration on substrates other than printed circuit boards, for example on glass and/or transparent plastic substrates. Although HIR may include the use of glass substrates as intermediate carriers, we are unaware of total systems integration of the form proposed herein being conducted on glass. The wireless transceiver may include no printed circuit board substrates. Although the wireless transceiver may include no printed circuit board substrates, it may be connected to separately packaged devices, for example a power supply, which may include printed circuit board substrates.

The circuit may include an analog circuit configured for analog beamforming of the first phased array and/or analog beamsteering of the second phased array. The analog circuit may receive and re-transmit the radio signals without conversion to the digital domain.

The analog circuit may include a first varactor diode corresponding to each first antenna of the first phased array. Each first varactor diode may be configured to apply a phase shift to a signal received from the respective first antenna. The circuit may be configured to control the plurality of first antennae as the first phased array by controlling the capacitances of the first varactor diodes. The circuit may be configured to control the capacitances of the first varactor diodes by controlling a reverse bias applied to each first varactor diode.

The analog circuit may include a second varactor diode corresponding to each second antenna of the second phased array. Each second varactor diode may be configured to apply a phase shift to a signal being transmitted to the respective second antenna. The circuit may be configured control the plurality of second antennae as the second phased array by controlling the capacitances of the second varactor diodes. The circuit may be configured to control the capacitances of the second varactor diodes by controlling a reverse bias applied to each second varactor diode.

The circuit may include one or more digital circuits configured for digital beamforming of the first phased array and/or digital beamsteering of the second phased array. The circuit may include a digital channel corresponding to each of the first antennae. The circuit may include a digital channel corresponding to each of the second antennae.

The circuit may also include a down-conversion section configured to convert signals received from the first antennae from a transmit band to a baseband. The circuit may also include one or more digital circuits configured to perform digital beamforming on the down converted signals to obtain a summed signal, and to perform beam-steering on the summed signal to generate and output a plurality of transmit signals. The circuit may also include an up-conversion section configured to convert the transmit signals from the baseband to the transmit band and to output the up-converted transmit signals to corresponding second antennae.

Down-conversion and up-conversion refer to signal carrier frequencies. Down-conversion and/or up-conversion may utilise standard heterodyning techniques and apparatuses. Baseband may refer to a carrier frequency at or close to zero frequency, or equivalently the absence of a carrier frequency. Conversion to baseband may allow use of lower performance analog-to-digital convertors (ADCs).

The plurality of first antennae may be arranged into a number of first sub-arrays. Each first sub-array may include two or more of the first antennae. The second antennae may be arranged into a plurality of second sub-arrays. Each second sub-array may include two or more of the second antennae. The circuit may be configured for hybrid beamforming and/or beamsteering. The circuit may include a digital channel corresponding to each of the first sub-arrays. The circuit may include a digital channel corresponding to each of the second sub-arrays.

The circuit may also include a number of first analog circuits. Each first analog circuit may be configured to perform analog beamforming on signals received from a respective first sub-array. The circuit may also include a number of second analog circuits. Each second analog circuit may be configured to perform analog beamsteering for a respective second sub-array. The circuit may also include one or more digital circuits configured to perform digital beamforming on signals received from the first analog circuits to obtain a summed signal, and to perform beam-steering on the summed signal to generate and output a number of transmit signals to respective second analog circuits.

Each first analog circuit may include a first varactor diode corresponding to each first antenna of the respective first sub-array. Each first varactor diode may be configured to apply a phase shift to a signal received from the respective first antenna. Each first analog circuit may be configured to perform analog beamforming on signals received from the respective first sub-array by controlling the capacitances of the corresponding first varactor diodes. Each first analog circuit may be configured to control the capacitances of the corresponding first varactor diodes by controlling a reverse bias applied to each first varactor diode.

Each second analog circuit may include a second varactor diode corresponding to each second antenna of the respective second sub-array. Each second varactor diode may be configured to apply a phase shift to a signal being transmitted to the respective second antenna. Each second analog circuit may be configured to perform analog beamsteering for a respective second sub-array by controlling the capacitances of the corresponding second varactor diodes. Each second analog circuit may be configured to control the capacitances of the corresponding second varactor diodes by controlling a reverse bias applied to each second varactor diode.

The circuit may also include a down-conversion section configured to convert signals received from the first analog circuits from a transmit band to baseband for reception by the one or more digital circuits. The circuit may also include an up-conversion section configured to convert the transmit signals output from one or more digital circuits from the baseband to the transmit band for reception by a respective second analog circuit.

The circuit may include one or more filters. A filter may include, or take the form of, a film bulk acoustic resonator, FBAR. A filter may include, or take the form of, a thin-film bulk acoustic resonator, TFBAR. A filter may include, or be formed from, metamaterials. Metamaterial filters suitable for use in the wireless transceiver include, without being limited to, metamaterial filters described in "Metamaterial Structure Inspired Miniature RF/Microwave Filters", Abdullah Alburaikan, PhD Thesis (2016), The University of Manchester, https://www.escholar.manchester.ac.uk/up-ac-man-scw:305308, (see in particular pages 56 onwards).

The wireless transceiver may be configured for a radio signal in accordance with the definition of 5G used in "5G Evolution: A View on 5G Cellular Technology Beyond 3GPP Release 15", Amitabha Ghosh, Andreas Maeder, Matthew Baker and Devaki Chandramouli, IEEE Access (2019), Vol. 7, pg 127639, DOI 10.1109/ACCESS.2019.2939938.

The wireless transceiver may be configured for radio signals having carrier frequencies between and including 5 GHz and 300 GHz. The wireless transceiver may be configured for radio signals having carrier frequencies between and including 30 GHz and 300 GHz. The wireless transceiver may be configured for radio signals having carrier frequencies within one or more of the K (20 GHz to 40 GHz), L (40 GHz to 60 GHz) and M (60 GHz to 100 GHz) bands defined by NATO. The wireless transceiver may be configured for radio signals having carrier frequencies within one or more of the Ka (27 GHz to 40 GHz), V (40 GHz to 75 GHz) and W (75 GHz to 110 GHz) bands defined by the Institute of Electrical and Electronics Engineers (IEEE). The wireless transceiver may be configured for radio signals having carrier frequencies exceeding 300 GHz. The wireless transceiver may be configured for radio signals having carrier frequencies equaling or exceeding 1 THz. The wireless transceiver may be configured for a radio signal which is a 5G signal. The wireless transceiver may be configured for a radio signal which is a 6G signal. The wireless transceiver may be configured for a radio signal which is a 7G signal.

The wireless transceiver may also include a number of third antennae supported on the second face and a number of fourth antennae supported on the first face. The circuit may also be configured to control the third antennae as a third phased array to receive radio signals. The third phased array may be directional and controllably orientable within a third range of acute angles to a normal of the second face. The circuit may also be configured to control the plurality of fourth antennae as a fourth phased array to retransmit the radio signals received using the third phased array. The fourth phased array may be directional and controllably orientable within a fourth range of acute angles to a normal of the second face.

In this way, the device may relay radio signals from the first face to the second face using the first and second antennae, and may relay signals in the opposite direction using the third and fourth antennae. On the first face, the first antennae may provide receiving, Rx, antennae and the fourth antennae may provide transmitting, Tx, antennae. On the second face, the third antennae may provide receiving, Rx, antennae and the second antennae may provide transmitting, Tx, antennae.

Any features described in relation to the first and/or second antennae may be duplicated for, or used in combination with, the third and/or fourth antennae. Any features described in relation to relaying radio signals from the first to second antennae may be duplicated for, or used in combination with, relaying radio signals from the third to fourth antennae. The beamforming and/or beam steering for the third and fourth phased arrays may be implemented using analog, digital, or hybrid approaches.

The circuit may include a first circuit configured to control relaying radio signals from the first to second antennae and a second circuit which may be the same as the first circuit except that the second circuit may be configured to control relaying radio signals from the third to fourth antennae.

The third antennae may be disposed directly on the second face. One or more dielectric layers may be disposed between the third antennae and the second face. The fourth antennae may be disposed directly on the first face. One or more dielectric layers may be disposed between the fourth antennae and the first face.

The circuit may be configured, during a first period of an alternating cycle, to control the first antennae as the first phased array to receive radio signals, and to control the second antennae as the second phased array to retransmit the radio signals received using the first phased array. The circuit may be configured, during a second period of the alternating cycle, to control the plurality of second antennae as the second phased array to receive radio signals, and to control the plurality of first antennae as the first phased array to retransmit the radio signals received using the second phased array.

In this way, the first and second antennae may be multiplexed to function as transceivers. During the first period radio signals may be relayed in one direction, and during the second period the direction of relaying radio signals may be reversed. The alternating cycle of first and second periods may be repeated whilst the wireless transceiver is active. The first and second periods may have the same length. The first and second periods may have different lengths.

The radio signals transmitted away from the second face may have a lower power than radio signals transmitted away from the first face. For example, the first face may be oriented towards the outside of a building whilst the second face is oriented towards an interior of the building. Using reduced power levels for radio signals retransmitted inside the building, compared to those required for transmission back to the wider external network, may reduce power consumption of the device. Using reduced power levels for signals retransmitted inside the building may reduce interference with other electronics devices and/or equipment inside the building. Using reduced power levels for signals retransmitted inside the building may provide reassurance to any building occupants/users concerned about the intensity of radio signals.

The first and/or second antennae may include a dielectric material having a loss-tangent which is less than a loss-tangent of the planar substrate.

The dielectric material may have a loss-tangent which is less than a loss-tangent of the planar substrate at a frequency of 28 GHz. A loss tangent of the planar substrate may be two times, three times, five times or ten times greater than a loss tangent of a dielectric material included in the first and/or second antennae. A loss tangent of the planar substrate may be two times, three times, five times or ten times greater than a loss tangent of a dielectric material included in the first and/or second antennae at a frequency of 28 GHz. The dielectric material may be disposed between ground and radiation planes of the first and/or second antennae. The third and/or fourth antennae may include the dielectric material. The dielectric material may be disposed between ground and radiation planes of the antennae.

In this way, the device may optionally utilise low-loss dielectric materials for antennae, whilst the direct, hard wired connections between the antennae and the circuit mean that the planar substrate is not required to be formed from low-loss materials, and may instead be formed from relatively high dielectric-loss materials such as silica glass and/or polymers. This may reduce the cost and manufacturing complexity, for example by enabling use of high-loss but flexible polymer films suitable for roll-to-roll manufacturing methods.

The dielectric material may include one or more of inorganic oxides, silica, alumina, an organic material, a fluoropolymer, polytetrafluoroethylene and nanocomposite. The dielectric material may take the form of a film may have a thickness of between and including 1 μm and 1 mm. The dielectric material may be include amorphous and/or crystalline regions of the same material. Where the dielectric material exhibits polymorphism, the dielectric material may include two or more different polymorphs, and optionally amorphous material.

The dielectric material may have a loss-tangent of less than or equal to $10^{-3}$ at a frequency of 28 GHz. The dielectric material may have a loss-tangent of less than or equal to $10^{-4}$, $10^{-5}$ or $10^{-6}$ at a frequency of 28 GHz. The dielectric material may have a loss-tangent of greater than or equal to $10^{-2}$, $10^{-1}$ or 1 at a frequency of 28 GHz. The planar substrate may have a loss tangent of greater than or equal to $10^{-3}$ at a frequency of 28 GHz.

The first antennae and/or the second antennae may be formed using photolithography.

The third antennae and/or the fourth antennae may be formed using photolithography.

The third antennae and/or the fourth antennae may include the same dielectric material as the first antennae and/or the second antennae.

The circuit may define two or more passbands for receiving and retransmitting radio signals. The circuit may be configurable such that one or more of the passbands may be disabled. Different passbands may correspond to different service providers of a wireless communications network. Service providers may be mobile telephone, cell service and/or data service providers.

Each of the two or more passbands may include one or more analog filters. Analog filters may include, or take the form of, film bulk acoustic resonators, FBAR. Analog filters may include, or take the form of, thin-film bulk acoustic resonators, TFBAR. The outputs of each passband provided by analog filters may be grounded to disable that passband. Passband outputs may be selectively grounded by respective switches controlled by the circuit.

Each of the two or more passbands may include one or more digital filters. Digital filters may be provided by a digital circuit configured to perform beamforming and/or beamsteering. Digital filters may be provided by a dedicated digital filtering circuit.

The circuit may be configurable such that each of the two or more passbands is independently enabled or disabled in a one-time configuration process. The one-time configuration process may include, or take the form of, programming a programmable read-only memory (programmable ROM). In an initial configuration of the wireless transceiver, each passband output may be grounded by a fuse connection, and the one-time configuration process may include, or take the form of, blowing the fuse connections corresponding to passbands which are to be enabled.

The circuit may be configurable such that each of the two or more passbands may be independently enabled or disabled in use.

The circuit may be configured to receive passband modification messages comprising instructions to enable one or more passbands and/or to disable one or more other passbands. Passband modification messages may be received through a wireless network which the wireless transceiver forms a part or portion of. Passband modification messages may be received as radio signals. Passband modification messages may be received within one of the two or more passbands defined by the circuit. Passband modification messages may be received within an additional passband which is always enabled.

The wireless transceiver may be configured to receive and retransmit radio signals within a time multiplexed wireless communications system. The circuit may be configurable to only retransmit radio signals corresponding to one or more selected service providers. The circuit may be configured to identify the source of a received radio signal, for example using packet header data. In response to the source of a received radio signal corresponds to one of the selected service providers, the circuit may be configured to control the plurality of second antennae as a second phased array to retransmit that received radio signal. In response to the source of a received radio signal does not correspond to one of the selected service providers, the circuit may not retransmit that received radio signal.

The selected service providers may be updatable in use. The circuit may be configured to receive selected service provider modification messages comprising instructions to enable retransmission of radio signals originating from one or more service providers and/or to disable retransmission of radio signals originating from one or more other service providers.

Selected service provider modification messages may be received through a wireless network which the wireless transceiver is a part of. Selected service provider modification messages may be received as radio signals.

The entire length of connections between the circuit and the plurality of first antennae may be supported by the planar substrate, and the entire length of connections between the circuit and the plurality of second antennae is supported by the planar substrate.

In this way, signals received and relayed between the plurality of first antennae and the plurality of second antennae are never routed off the planar substrate (though they are routed through the planar substrate using via's as described herein).

The wireless transceiver according to the first aspect may include features corresponding to any features of the wireless transceiver according to the second aspect and/or the wireless transceiver according to the third aspect.

According to a second aspect of the invention, there is provided a wireless transceiver including a number of first antennae and a number of second antennae. The wireless transceiver also includes a circuit connected to the first antennae and the second antennae. The circuit is configured to control the plurality of first antennae as a first phased array to receive radio signals. The first phased array is directional and controllably orientable within a first range of angles. The circuit is also configured to control the plurality of second antennae as a second phased array to retransmit the radio signals received using the first phased array. The second phased array is directional and controllably orientable within a second range of angles to a normal of the second face. The circuit defines two or more passbands for receiving and retransmitting radio signals. The circuit is configurable such that one or more of the passbands may be disabled.

The wireless transceiver according to the second aspect may include features corresponding to any features of the wireless transceiver according to the first aspect and/or the wireless transceiver according to the third aspect.

The wireless transceiver may also include a planar substrate having first and second faces. The first antennae may be supported on the first face. The second antennae may be supported on the second face. The circuit may be supported on and/or within the planar substrate. The first range of angles may be a first range of acute angles to a normal of the first face. The second range of angles may be a second range of acute angles to a normal of the second face.

Different passbands may correspond to different service providers of a wireless communications network. Service providers may be mobile telephone, cell service and/or data service providers.

Each of the two or more passbands may include, or take the form of, one or more analog filters. Analog filters may include, or take the form of, film bulk acoustic resonators, FBAR. Analog filters may include, or take the form of, thin-film bulk acoustic resonators, TFBAR. The outputs of each passband provided by analog filters may be grounded to disable that passband. Passband outputs may be selectively grounded by respective switches controlled by the circuit.

Each of the two or more passbands may include, or take the form of, one or more digital filters. Digital filters may be provided by a digital circuit configured to perform beamforming and/or beamsteering. Digital filters may be provided by a dedicated digital filtering circuit.

The circuit may be configurable such that each of the two or more passbands may be independently enabled or disabled during a one-time configuration process. The one-time configuration process may include, or take the form of, programming a programmable read-only memory (programmable ROM).

In an initial configuration of the wireless transceiver, each passband output may be grounded by a fuse connection, and the one-time configuration process may include, or take the form of, blowing the fuse connections corresponding to passbands which are to be enabled.

The circuit may be configurable such that each of the two or more passbands may be independently enabled or disabled in use. The circuit may be configured to receive passband modification messages comprising instructions to enable one or more passbands and/or to disable one or more other passbands. Passband modification messages may be received through a wireless network which the wireless transceiver is a part of. Passband modification messages may be received as radio signals. Passband modification messages may be received within one of the two or more passbands defined by the circuit. Passband modification messages may be received within an additional passband which is always enabled.

According to a third aspect of the invention, there is provided a wireless transceiver including a number of first antennae and a number of second antennae. The wireless transceiver also includes a circuit connected to the first antennae and the second antennae. The circuit is configured to control the first antennae as a first phased array to receive radio signals. The first phased array is directional and controllably orientable within a first range of angles. The circuit is also configured to control the second antennae as a second phased array to retransmit the radio signals received using the first phased array. The second phased array is directional and controllably orientable within a second range of angles to a normal of the second face. The wireless transceiver is configured to receive and retransmit radio signals within a time multiplexed wireless communications system. The circuit is configurable to only retransmit radio signals corresponding to one or more selected service providers.

The wireless transceiver according to the third aspect may include features corresponding to any features of the wireless transceiver according to the first aspect and/or the wireless transceiver according to the second aspect.

The wireless transceiver may also include a planar substrate having first and second faces. The first antennae may be supported on the first face. The second antennae may be supported on the second face. The circuit may be supported on and/or within the planar substrate. The first range of angles may be a first range of acute angles to a normal of the first face. The second range of angles may be a second range of acute angles to a normal of the second face.

The circuit may be configured to identify the source of a received radio signal, for example using packet header data. In response to the source of a received radio signal corresponds to one of the selected service providers, the circuit may be configured to control the second antennae as a second phased array to retransmit that received radio signal. In response to the source of a received radio signal does not correspond to one of the selected service providers, the circuit may not retransmit that received radio signal.

The selected service providers may be updatable in use. The circuit may be configured to receive selected service provider modification messages comprising instructions to enable retransmission of radio signals originating from one or more service providers and/or to disable retransmission of radio signals originating from one or more other service providers.

Selected service provider modification messages may be received through a wireless network which the wireless transceiver is a part of. Selected service provider modification messages may be received as radio signals.

A structure may include one or more wireless transceivers according to any one of the first, second and/or third aspects.

The structure may include, or take the form of, a building. The building may be a commercial, residential or civic building. The structure may include, or take the form of, an item of street furniture such as, for example, a street light, a bench, a bus shelter, a signpost or sign, a parking meter, a safety barrier, an advertising hoarding or billboard, and so forth.

The structure may include a window having interior and exterior surfaces, and the wireless transceiver may be attached to the interior surface of the window.

According to a fourth aspect of the invention, there is provided a method of using a wireless transceiver according to any one of the first, second and/or third aspects or a structure incorporating a wireless transceiver according to any one of the first, second and/or third aspects. The method includes controlling the first antennae as a first phased array to receive radio signals. The first phased array is directional and controllably orientable within a first range of angles. The method also includes controlling the second antennae as a second phased array to retransmit the radio signals received using the first phased array. The second phased array is directional and controllably orientable within a second range of angles.

The method may include features corresponding to any features of the wireless transceiver according the first aspect, the wireless transceiver according the second aspect and/or the wireless transceiver according to the third aspect.

According to a fifth aspect of the invention, there is provided a wireless transceiver include a planar substrate having first and second opposite faces and having a thickness between the first and second opposite faces. The wireless transceiver also includes a number of first antennae supported on the first face. The wireless transceiver also includes a number of second antennae supported on the second face. The wireless transceiver also includes a circuit supported by the planar substrate and connected to the first antennae and the second antennae. The circuit includes a number of vias formed through the thickness of the planar substrate for transmission of signals between the circuit and the first antennae and/or between the circuit and the second antennae. The circuit is configured to control the first antennae to receive radio signals. The circuit is also configured to control the second antennae as a second phased array to retransmit the radio signals received using the first phased array. The second phased array is directional and controllably orientable within a second range of acute angles to a normal of the second face.

The wireless transceiver according the fifth aspect may include features corresponding to any features of the wireless transceiver according the first aspect, the wireless transceiver according the second aspect, the wireless transceiver according to the third aspect and/or the method according to the fourth aspect.

BRIEF DESCRIPTION OF THE DRAWINGS

Certain embodiments of the present invention will now be described, by way of example, with reference to the accompanying drawings in which.

DETAILED DESCRIPTION

Figure 1:
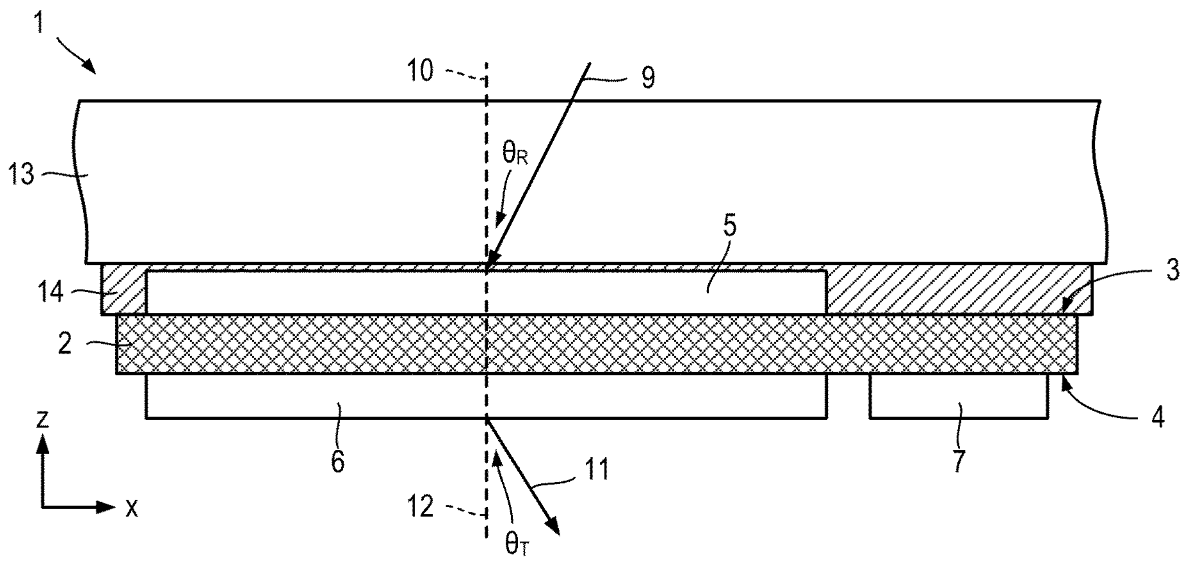
FIG. 1 is a schematic cross-section of a wireless transceiver attached to a window.

In the following description, like parts are denoted by like reference numerals.

The problems of line-of-sight to a base station and atmospheric and/or weather attenuation of radio signals may be addressed by adding further wireless transceivers to a wireless network. However, in order to do this in practice, wireless transceivers are required which are small, high-gain, steerable and inexpensive and which do not require large amounts of power. The direction of the Poynting vector of radio signals, especially for non-line-of-sight environments, is important to maximising quality of service performance. It is also desirable that the wireless transceivers used should be aesthetically unobtrusive, i.e. small and preferably easy to disguise and/or integrate into an environment. The present specification describes wireless transceivers which address, amongst other problems, these issues.

The current infrastructure for wireless communications is expected to encounter limitations and underlying issues which will make it difficult to scale towards higher frequencies, for example towards (or beyond) mm-waves. As the demand for higher bandwidth is driven ever upwards for new services such as mobile data, content streaming and so forth, the size of an area (or "cell") covered by a single transmitter tower had become increasingly small. This trend is expected to continue for frequencies above 5 GHz, often referred to as "5G". The current conventional infrastructure of cell towers is already approaching its limits, and a new approach is required as wireless communications networks increasing move towards a line-of-sight, point-to-multipoint system operating at high frequencies and high data rates. Such high frequency communications, for example mm-wave, may also benefit considerably from the use of massively multi-input-multiple-output antenna architectures to allow beam-forming and beam-steering. Highly directional operation may help to avoid issues with multi-path interference.

Driven by consumer demands for increasingly diverse and immersive mobile data services, for example High-definition video streaming, cloud-based services, augmented reality and so forth, next generation wireless communication networks and systems will need to offer high throughput, low latency and reliability to remain competitive. For example, beyond the currently planned infrastructure to move up to 6 GHz, there is an additional 200 GHz of spectrum available at mm-wave frequencies that is underutilized, and which could potentially support data rates in the region of 10 to 50 Gb per second.

Wide spectrum does not mean it is unlimited, and other services will also utilize the same, or neighbouring, bands. If significant portion of spectrum is exclusively granted to a single independent mobile network operator, there will be inefficiency of spectrum utilization. An average consumer may utilise cm-waves with spectrum ranging from 3 to 30 GHz, and between 30 and 40 GHz (up to 300 GHz) as a mm-wave spectrum. There is also spectrum sharing at 60 to 70 GHz for mission-critical services, which includes smart city infrastructure, healthcare, self-driving cars, and many other applications. Such services should preferably have access to a continuous high-speed, low-latency connection, and shared spectrum has the potential to help ensure that devices are always connected.

The present specification is concerned with wireless transceivers for relaying radio signals, in particular radio signals exceeding 5 GHz used for data transmission in wireless communications networks (for example mobile/cell services). Amongst other features, the wireless transceivers described herein are compact and low profile, allowing for straightforward attachment to, or integration into, structures in a built environment. Wireless transceivers according to the present specification may be particularly suitable for attachment to, or integration into, window glass, and may retain sufficient transparency to be see-through to human observers.

These features allow wireless transceivers to be added to structures in order to improve range, reduce blind spots, relay signals to the interior of structures or underground (for example metro transit systems), and so forth.

Figure 2:
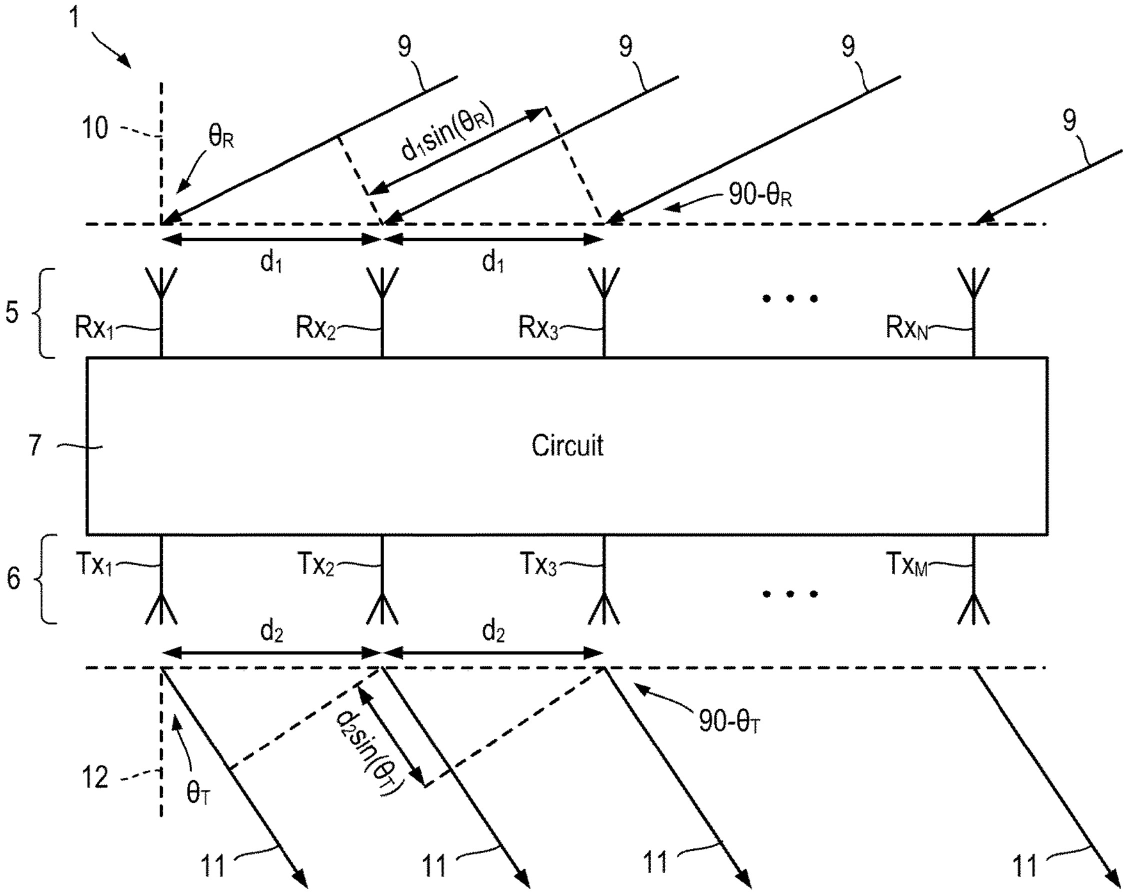
FIG. 2 is a schematic illustration of using the wireless transceiver of FIG. 1 for directional reception and transmission of radio signals.

Referring to FIGS. 1 and 2, a wireless transceiver 1 is shown.

The wireless transceiver 1 includes a planar substrate 2 having first 3 and second 4 opposite faces and having a thickness t between the first and second opposite faces 3, 4. A first array 5 including a number N of first antennae $Rx_1, \ldots, Rx_n, \ldots, Rx_N$ is supported on the first face 3 and a second array 6 including a number M of second antennae $Tx_1, \ldots, Tx_m, \ldots, Tx_M$ is supported on the second face 4. A circuit 7 is supported by the planar substrate, and the circuit 5 is electrically connected to the N first antennae $Rx_n$ and the M second antennae $Tx_m$. The circuit 7 includes a number of vias 8 (FIG. 7) formed through the thickness t of the planar substrate 2 for transmission of radio frequency electrical signals between the circuit 7 and the first array 5 of first antennae $Rx_n$ and/or between the circuit 7 and the second array 6 of second antennae $Tx_m$.

The wireless transceiver 1 provides a transceiver (alternatively a "base station" or a "relay station") of a wireless communication network, for example a network used by mobile phones and similar devices.

The circuit 7 is configured to control the array 5 of first antennae $Rx_n$ as a first phased array 5 to receive incoming radio signals 9. The first phased array 5 is directional and controllably orientable within a first range $\Delta\theta_1$ of acute angles $\theta_R$ to a normal 10 of the first face 3. The direction in which the first phased array 5 is oriented may correspond to an axis of a principle radiation lobe of a first radiation pattern of the first phased array 5. The first range $\Delta\theta_1$ may range between and inclusive of 0 and 90 degrees, i.e. $0 \leq \Delta\theta_1 \leq 90$. The first $\Delta\theta_1$ range may include all, or less than all, of a first hemisphere directed away from the first face 3. For example, the first range may encompass an angular range which is less than or equal to $2\pi$ steradians, less than or equal to $3\pi/4$ steradians, less than or equal to a steradians, or less than or equal to $\pi/2$ steradians.

The first range $\Delta\theta_1$ may be substantially circularly symmetric about a normal 10 to the first face 10, for example first range $\Delta\theta_1$ may be cone shaped, horn-shaped and so forth. However, the range $\Delta\theta_1$ need not be circularly symmetric about a normal 10 to the first face 3, for example the first range $\Delta\theta_1$ may be substantially fan-shaped within a plane. In general, depending on the configuration of the first antennae $Rx_n$ forming the first phased array 5, the first phased array 5 may be controllably orientable in use about first and/or second axes. For example, if a polar coordinate system $(\theta_R, \varphi_R)$ is defined relative to the normal 10, then the maximum $\theta_{Rmax}$ and minimum polar angles $\theta_{Rmin}$ to which the first phased array 5 may be steered in use may be a function of the azimuthal angle $\varphi$ about the normal 10, i.e. $\theta_{Rmin}(\varphi_R) \leq \theta_R \leq \theta_{Rmax}(\varphi_R)$. When the wireless transceiver 1 is installed, the planar substrate 2 may be oriented at any angle. For example, the planar substrate 2 may be installed vertically with respect to gravity, such that the normal 10 lies in a horizontal plane.

The circuit 7 is also configured to control the array 6 of second antennae $Tx_m$ as a second phased array 6 to transmit outgoing radio signals 11 which correspond to re-transmissions of the radio signals 9 received using the first phased array 5. The second phased array 6 is directional and controllably orientable within a second range $\Delta\theta_2$ of acute angles $\theta_T$ to a normal 11 of the second face 4. Aside from being oriented in the opposite hemisphere to the first range $\Delta\theta_1$, the second phased array 6 and the second range $\Delta\theta_2$ may be configured relative to the second normal 12 in any way described in relation to the first phased array 5 and the first range $\Delta\theta_1$ relative to the first normal 10.

The first 5 and second 6 phased arrays are controllably orientable in the sense that the orientation directions of the first and second phased arrays 5, 6 is not fixed, and may be independently varied in use by the circuit 7. For example, if a spherical polar coordinate system is defined with a zenith aligned with the first normal 10, then an orientation direction (central axis of radiation lobe) for the first phased array 5 may be $(\theta_R, \varphi_R)$, and an orientation direction (central axis of radiation lobe) for the second phased array 6 may be $(\theta_T, \varphi_T)$ (with $0 \leq \theta_R \leq \pi/2$ and $\pi/2 \leq \theta_R \leq \pi$, and possibly further constrained by as a function of azimuthal angle to respective maxima and minima $\theta_{Rmin}(\varphi_R) \leq \theta_R \leq \theta_{Rmax}(\varphi_R)$, and $\theta_{Tmin}(\varphi_T) \leq \varphi_T \leq \theta_{Tmax}(\varphi_T)$).

The direction $(\theta_R, \varphi_R)$ is controlled by adjusting relative phases used by the circuit 7 to sum the radio signals 9 received by the first antennae $Rx_1, \ldots, Rx_N$. Referring in particular to FIG. 2, if a spacing of the first antennae $Rx_n$ within the first phased array 5 is $d_1$, then a radio signal 9 incident at an angle $\theta_R$ will have a path difference of $d_1 \cdot \sin(\theta_R)$ between adjacent first antennae $Rx_n$, $Rx_{n+1}$. FIG. 2 shows the path difference $d_1 \cdot \sin(\theta_R)$ in a plane corresponding to the azimuthal angle $\varphi$ for simplicity of illustration. The path difference $d_1 \cdot \sin(\theta_R)$ corresponds to a phase difference, and by controlling the phase differences applied to signals from each first antenna $Rx_n$, the circuit 7 may select for constructive interference of radio signals 9 incident from a particular direction $(\theta_R, \varphi_R)$, whilst radio signals 9 incident from other directions will experience attenuation by destructive interference. In addition to the phase shifts used by the circuit 7 for the summation, the overall shape of the effective radiation pattern of the first phased array 5 will also depend on the radiation patterns of the individual first antennae $Rx_n$. This process is often termed "beamforming". Beamforming using a phased array is an established technology, and consequently for brevity shall not be described in detail herein.

Similarly, the circuit 7 controls relative phases for retransmission of the radio signals 11 in a direction $(\theta_T, \varphi_T)$ using the second antennae $Tx_1, \ldots, Tx_M$ in a beamsteering process which is an analogue of the beamforming for the first phased array 5. Similarly, for brevity the technology of beamsteering shall not be described in detail herein.

In general, the wireless transceiver 1 will receive from one direction $(\theta_R, \varphi_R)$, for example a direction to a broadcast tower (or cell tower) of a wireless communication network, and re-transmit (re-broadcast/relay) in a different direction $(\theta_T, \varphi_T)$, for example towards the interior of a building or even towards a particular user device such as a mobile telephone.

The wireless transceiver 1 is configured to send and receive radio signals 9, 11 having carrier frequencies between and including 5 GHz and 300 GHz, for example, within one or more of the K (20 GHz to 40 GHz), L (40 GHz to 60 GHz) and/or M (60 GHz to 100 GHz) bands defined by NATO. Additionally or alternatively, the wireless transceiver 1 may be configured to send and receive radio signals 9, 11 having carrier frequencies within one or more of the $K_a$ (27 GHz to 40 GHz), V (40 GHz to 75 GHz) and W (75 GHz to 110 GHz) bands defined by the Institute of Electrical and Electronics Engineers (IEEE). The wireless transceiver 1 is not particularly limited by the frequency band(s) of operation, and may be scaled for radio signals 9, 11 having carrier frequencies exceeding 300 GHz, or even up to or above 1 THz. The wireless transceiver 1 may relay radio signals 9, 11 corresponding to consumer data services referred to as "5G", "6G" or any other notional generation of mobile data services. The wireless transceiver 1 may be configured for a radio signal in accordance with the definition of 5G used in "5G Evolution: A View on 5G Cellular Technology Beyond 3GPP Release 15", Amitabha Ghosh, Andreas Maeder, Matthew Baker and Devaki Chandramouli, IEEE Access (2019), Vol. 7, pg 127639, DOI 10.1109/ACCESS.2019.2939938.

The vias 8 (FIG. 7) are used for interconnection of components of different functionality which may be layered and/or patterned into devices or heterogeneously integrated as discrete components to form the circuit 7 or parts thereof. The circuit 7 is connected to the phased array 5 of first antennae $Rx_n$ and the phased array 6 of second antennae $Tx_m$ using physical, hard-wired links such as, for example, conductive traces, micro-strip lines, conductive vias and so forth.

Figure 7:
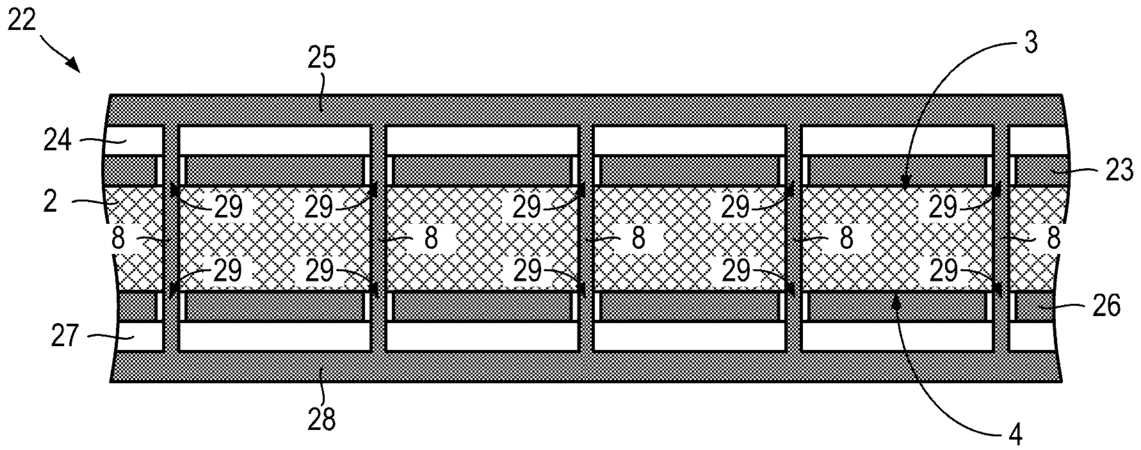
FIG. 7 is a schematic cross-section of a first example of an antenna stack.

The manner of heterogeneous integration of the circuit 7 components, the first antennae $Rx_n$ and the second antennae $Tx_m$ on, or within, the planar substrate 2, is an important feature of the wireless transceiver 1. In particular, radio signals 9, 11 are not radiatively coupled between the first and second faces 3, 4, and instead are piped through the thickness t of the substrate 2 using a number of vias 8 (FIG. 7). Consequently, the dielectric loss characteristics of the planar substrate 2 are not substantially relevant to the function of the wireless transceiver 1, opening up the possibility to use unconventional materials such as glass and/or transparent polymers.

In this way, the planar substrate 2 may optionally be formed using a transparent material (for example having a minimum transmission of 50% for visible wavelengths). A transparent planar substrate 2 may include, or be formed from, glass, or using one or more plastics including but not limited to polycarbonate (PC), polyimide (PI), polyethylene terephthalate (PET), polyethylene naphthalate PEN, cyclo olefin polymer (COP), or any other polymer having sufficient mechanical strength to support the circuit and sufficient transparency to be seen through. These materials would not conventionally be used as circuit substrates for radio frequency (RF) signals and/or as antenna substrates, due to excessive dielectric loss characteristics. However, by piping RF signals through the substrate 2 to the circuit 7 using the vias 8 (FIG. 7), these types of lossy materials may be used. This may be advantageous because a substantial fraction of the wireless transceiver 1, including the arrays 5, 6 of antennae $Rx_n$, $Tx_m$, may potentially be made transparent or semi-transparent. For example, by using very fine and/or thin conductive traces, metallic nanowires, metal meshes and so forth to define the antennae $Rx_n$, $Tx_m$.

Largely transparent wireless transceivers 1 may be applied to interior surfaces of a window glass 13 of a building or other structure, for example using an adhesive layer 14, without significantly obscuring the view of people inside or reducing the natural illumination from the window 13. In this way, radio signals 9 incident on the window 13 may be retransmitted 11 deeper into the building or structure.

The planar substrate 2 does not need to be a single, monolithic block of material, and may in some examples take the form of a laminate (not shown) including one or more layers of glass and/or plastic and/or adhesive. A laminate may include one or more conductor layers, which may be internal (i.e. between the first and second faces 3, 4), and/or external (i.e. supported on the first and/or second faces 3, 4).

The planar substrate 2 may be thin enough to be flexible, for example a thin film or sheet of a polymer material.

The first antennae $Rx_n$ may be disposed directly on the first face 3. Alternatively, one or more dielectric layers may be disposed between the first antennae $Rx_n$ and the first face 3, for example, in order to define both the radiating and ground planes of the first antennae $Rx_n$ over the first face 3. Similarly, the second antennae $Tx_m$ may be disposed directly on the second face 4, or separated from the second face 4 by one or more dielectric layers.

The integration of the circuit 7 with the planar substrate 2 is not particularly limited, and in general the circuit 7 may include one or more components supported on the first face 3 and/or one or more components supported on the second face 4. In some examples, the circuit 7 may additionally or alternatively include one or more components supported within the planar substrate 2. For example, if the planar substrate 2 is a laminate, then components of the circuit 7 may be supported on one or more surfaces of the layers making up the laminate which are internal (between first and second faces 3, 4) when the laminate is assembled.

The circuit 7 may include one or more components flip-chip bonded to the planar substrate 2, for example to the first face 3, to the second face 4, or to a face of a layer which will be internal to a laminate once the planar substrate 2 is assembled. Such one or more components of the circuit 7 may be flip-chip bonded to the planar substrate 2 (or a layer thereof) in accordance with the Heterogeneous Integration Roadmap, HIR.

The Heterogeneous Integration Roadmap (HIR) is a set of guidelines developed for silicon systems-in-package (SiP) technologies. HIR may refer to, for example, the guidelines set out in the publication of the HIR 2019 edition. Although established for semiconductor/flat panel device fabrication using substrates for packaging semiconductor/flat panel devices, to the best of the inventor's knowledge the methods of the HIR have not previously been adapted to heterogeneous integration on substrates other than printed circuit boards, for example on glass and/or transparent plastic substrates. Although the HIR describes the use of glass substrates as intermediate carriers, the inventors of the present specification are unaware of total systems integration of the form proposed herein being conducted on glass or transparent polymers. In some examples, the wireless transceiver 1 itself may include no conventional printed circuit board substrates such as glass fibre-epoxy, cardboard, copper clad laminate, FR2/FR4 printed circuit boards polytetrafluoroethylene (PTFE) and so forth. Of course, this does not preclude the wireless transceiver 1 being connected to separately packaged devices, for example a power supply (not shown), which may include conventional printed circuit board substrates (not shown). In other examples, conventional printed circuit board substrates, for example those mentioned hereinbefore, may be used in the wireless transceiver 1 and/or the circuit 7, for example as the planar substrate 2.

The circuit 7 may include one or more filters, for example one or more film bulk acoustic resonators, FBAR, one or more thin-film bulk acoustic resonators, TFBAR, and/or one or more metamaterials. Metamaterial filters suitable for use in the wireless transceiver include, without being limited to, metamaterial filters described in "Metamaterial Structure Inspired Miniature RF/Microwave Filters", Abdullah Alburaikan, PhD Thesis (2016), The University of Manchester, https://www.escholar.mancherster.ac.uk/uk-ac-man-scw:305308, (see in particular pages 56 onwards). Filters for signals from the first antennae $Rx_n$ may be supported on the first face 3 for proximity, and filters for the signals to the second antennae $Tx_m$ may be supported on the second face 4 for the same reasons.

Film-based bulk acoustic wave resonators may offer properties including, but not limited to, low insertion loss, high selectivity at frequency bands including and in excess of 25 GHz bands, low power consumption, and high isolation as compared to surface acoustic wave (SAW) resonators with the same central frequency. Film-based bulk acoustic wave resonators may be configured for high (for example 60 GHz) frequencies, and may exhibit steep filter skirts because of their high Q-factor and high acoustic velocity, combined with high power handling. Materials having high thermal conductance are used. Possible materials may include aluminum nitride (AlN) as the dielectric—which is piezoelectric and is most widely magnetron sputtered at typically 200° C.-300° C., with electrode materials range from platinum (Pt) to copper (Cu). For example, conductive elements may be formed using copper, Cu, with a barrier layer comprising an alloy of copper, Cu and one or more refractory metal elements selected from tantalum, Ta, niobium, Nb, molybdenum, Mo, tungsten, W, zirconium, Zr, hafnium, Hf, rhenium, Re, osmium, Os, ruthenium, Ru, rhodium, Rh, titanium, Ti, vanadium, V, chromium, Cr, and nickel Ni. Copper is preferable due to high conductance of electricity and heat, though other metals may be used subject to suitable electrical conductivity and skin depth at the intended operating frequencies. Molybdenum may be a good choice since this metal provides a combination of a relatively moderate acoustic impedance, density, and resistivity, in addition to being widely available in any Gen-X flat panel line as a source/drain metallization standard. The term Gen-X is a standard term used in the flat panel industry, and refers to the size of the substrate. For example, Gen10+ refers to a substrate size up to 2840 mm by 3370 mm.

The planar substrate 2 may incorporate a heat spreader layer (not shown). The heat spreader layer may be incorporated during a heterogeneous integration fabrication process. A heat spreader layer may enable operation at higher power and/or using a higher density of antennae and/or microstrip interconnects without requiring a fan or other cooling method. In some examples, a ground plane layer 23, 26 (FIG. 7) may be formed from copper and may additionally serve as a heat spreader layer. Additionally or alternatively, an antenna dielectric layer 24, 27 (FIG. 7) may be formed from a dielectric with relatively high thermal conductance, for example AlN, or $AlO_x$ (in particular $Al_2O_3$ in the sapphire structure) may also serve as a good heat spreader layer.

The first and second antennae $Rx_n$, $Tx_m$ are preferably planar antennae. The first antennae $Rx_n$ and/or the second antennae $Tx_m$ may be formed using photolithography.

The entire length of the connections between the circuit 7 and the plurality of first antennae $R\mathbf{1}_x$, . . . , $Rx_N$ is supported by the planar substrate 2, and the entire length of connections between the circuit 7 and the plurality of second antennae $Tx_1$, . . . , $Tx_M$ is supported by the planar substrate 2. In this way, signals being relayed are not routed off the planar substrate. This may help to avoid interference associated with longer transmission line connections.

The wireless transceiver 1 is preferably attached to, or integrated as part of, a structure in the form of a commercial, residential or civic building (not shown). Alternatively, a wireless transceiver 1 may be attached to, or integrated with, an item of street furniture (not shown) such as, for example, a street light, a bench, a bus shelter, a signpost or sign, a parking meter, a safety barrier, an advertising hoarding or billboard, and so forth. In some examples, the wireless transceiver 1 includes a planar substrate 2 which is transparent, and is attached to a window 13 of the structure in the manner described hereinbefore.

Figure 3:
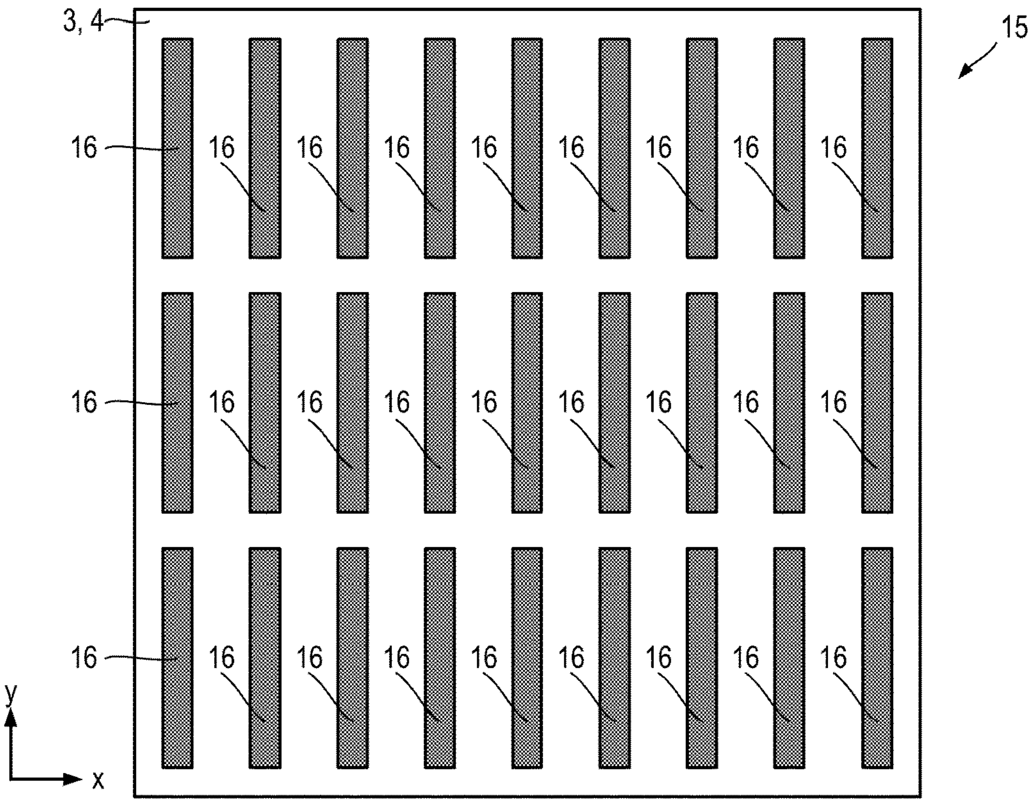
FIG. 3 is a schematic plan view of a first example of an antenna array layout.

Referring also to FIG. 3, a first example of an antenna array layout 15 (hereinafter "first antenna layout") is shown.

The first antenna layout 15 is formed from a number of planar strip antennae 16, arranged to form rows and columns. The strip antennae 16 may take the form of microstrip antennae. If deposited on, or over, the first face 3, the first antenna layout 15 may provide the first phased array 5 of N first antennae $Rx_1$, . . . , $Rx_N$. Additionally or alternatively, if deposited on, or over, the second face 4, the first antenna layout 15 may provide the second phased array 6 of M second antennae $Tx_1$, . . . , $Tx_M$.

The radiating and ground plane surfaces of the planar strip antennae 16 need to be high conductivity, typically copper, with high surface smoothness to minimize loss. The radiating and ground plane surfaces of the planar strip antennae 16 may be patterned using any suitable technique, and may be deposited by photolithography, etched, electroplated and so forth. The ground plane(s) may be disposed below the radiating electrodes, separated by a low-loss dielectric such as aluminum oxide ($Al_2O_x$), a fluoropolymer (such as PTFE/teflon), low-loss nanocomposites and so forth. Preferably all materials used should be compatible with Gen-X flat panel processing lines.

Figure 4:
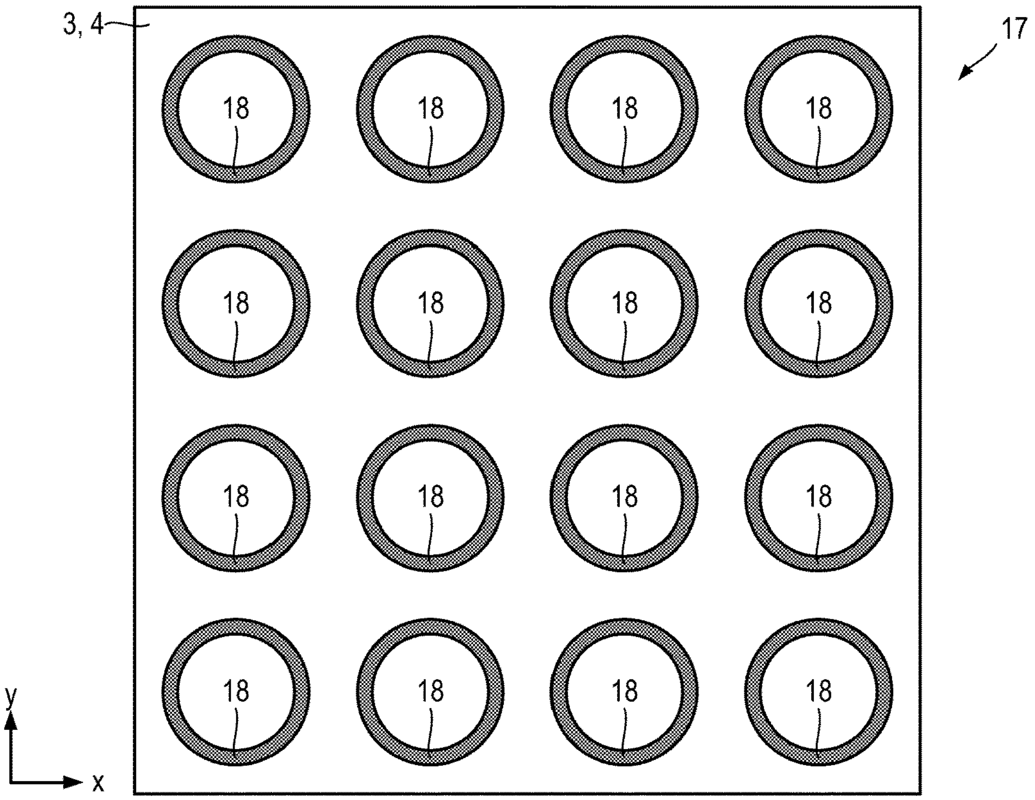
FIG. 4 is a schematic plan view of a second example of an antenna array layout.

Referring also to FIG. 4 a second example of an antenna array layout 17 (hereinafter "second antenna layout") is shown.

The second antenna layout 17 is formed from a number of planar loop antennae 18, arranged to form rows and columns. If deposited on, or over, the first face 3, the second antenna layout 17 may provide the first phased array 5 of N first antennae $Rx_1$, . . . , $Rx_N$. Additionally or alternatively, if deposited on, or over, the second face 4, the second antenna layout 17 may provide the second phased array 6 of M second antennae $Tx_1$, . . . , $Tx_M$.

Although shown as circular in FIG. 4, planar loop antennae 18 may have any shape such as, for example, square, rectangular, or any regular or irregular polygon, depending only on the desired shape of radiation pattern for the individual antennae $Rx_n$, $Tx_m$.

Figure 5:
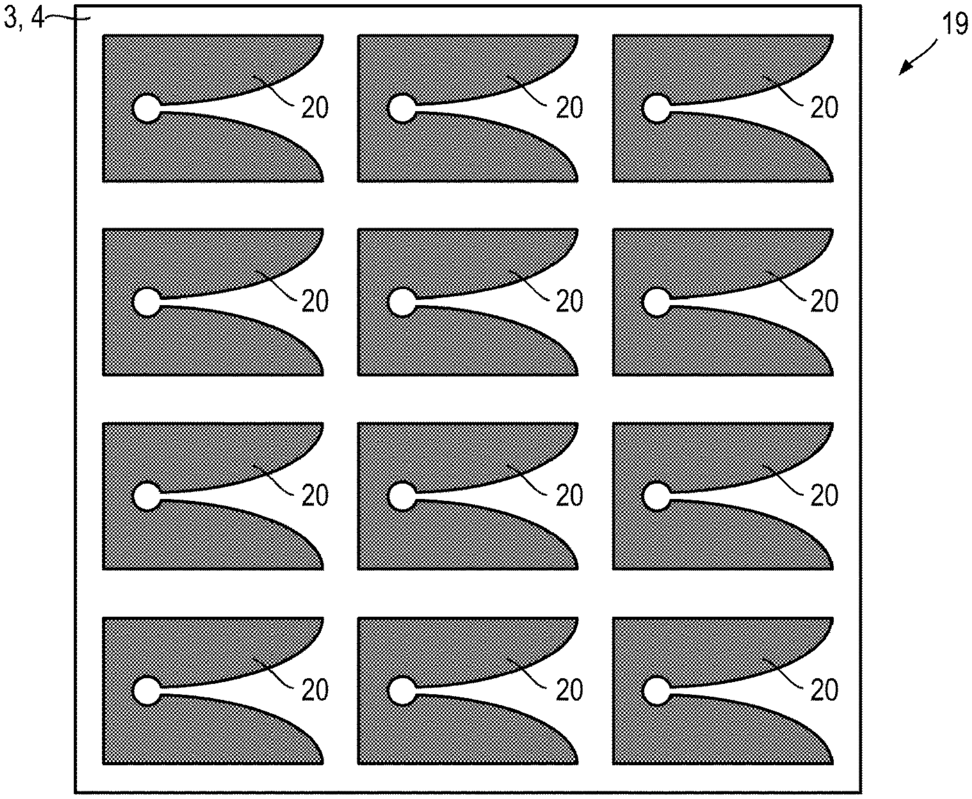
FIG. 5 is a schematic plan view of a third example of an antenna array layout.

More complex, directional planar antennae may be used. For example, referring also to FIG. 5, a third example of an antenna array layout 19 (hereinafter "third antenna layout") is shown.

The third antenna layout 17 is formed from a number of planar Vivaldi antennae 20, arranged to form rows and columns. All of the Vivaldi antennae 20 are oriented in the same direction. If deposited on, or over, the first face 3, the third antenna layout 19 may provide the first phased array 5 of N first antennae $Rx_1$, . . . , $Rx_N$. Additionally or alternatively, if deposited on, or over, the second face 4, the third antenna layout 19 may provide the second phased array 6 of M second antennae $Tx_1$, . . . , $Tx_M$.

Using directional antennae to form one or both the first and second phased arrays 5, 6 may provide improve directional selectivity, at the cost of being unable to steer the phased arrays 5, 6 to some angles corresponding to nodes of the antennae radiation patterns. This can be countered by including multiple sub-arrays of directional antennae oriented in different directions.

Figure 6:
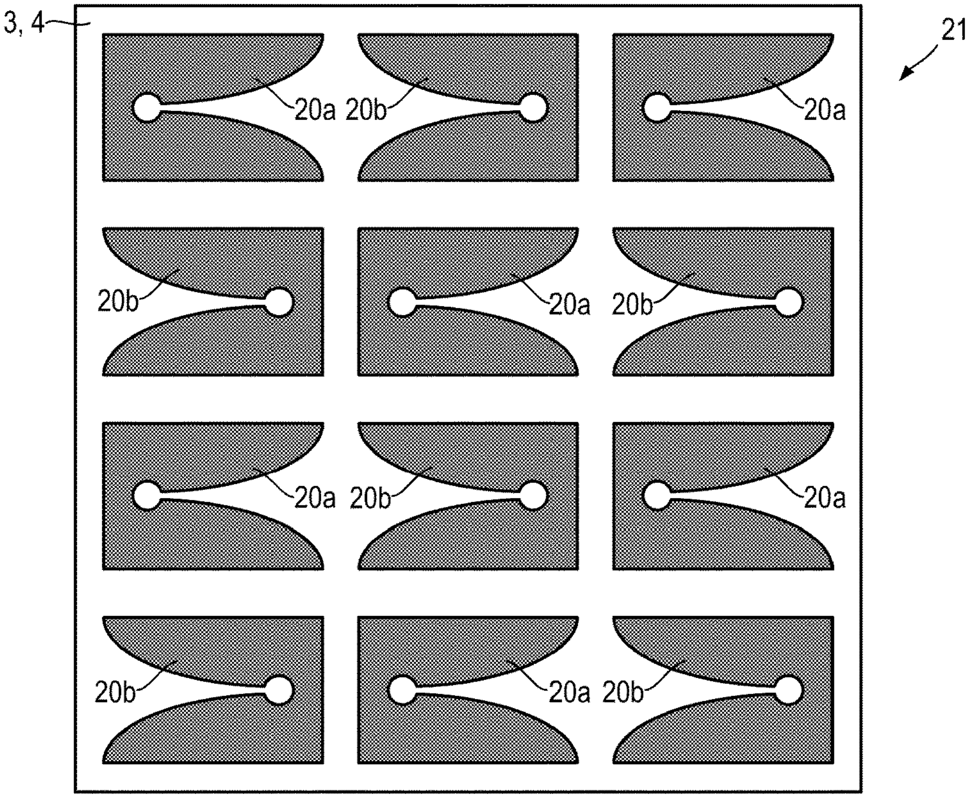
FIG. 6 is a schematic plan view of a fourth example of an antenna array layout.

For example, referring also to FIG. 6 a fourth example of an antenna array layout 21 (hereinafter "fourth antenna layout") is shown.

The fourth antenna layout 17 is formed from a number of first planar Vivaldi antennae 20*a* oriented towards the right as illustrated and a number of second planar Vivaldi antennae 20*b* oriented towards the left as illustrated. The first Vivaldi antennae 20*a* are arranged into a first two-dimensional lattice, and the second Vivaldi antennae 20*b* are arranged into a second two-dimensional lattice which interpenetrates the first lattice.

If deposited on, or over, the first face 3, the fourth antenna layout 21 may provide the first phased array 5 of N first antennae $Rx_1, \ldots, Rx_N$. Additionally or alternatively, if deposited on, or over, the second face 4, the fourth antenna layout 21 may provide the second phased array 6 of M second antennae $Tx_1, \ldots, Tx_M$.

Although particular numbers of antennae 16, 18, 20, 20*a*, 20*b* have been shown in FIGS. 3 to 6, the numbers N, M of first and second antennae $Rx_n$, $Tx_m$ are not limited.

In practical implementations, each of the first and second phased arrays 5, 6 may include hundreds, thousands, or even tens of thousands of first and second antennae $Rx_n$, $Tx_m$.

Although particular shapes and distributions of antennae 16, 18, 20, 20*a*, 20*b* have been shown in FIGS. 3 to 6, these are not limiting. In general, any type or shape of antennae may be used, though preferably planar antennae should be used for practicality of manufacturing and scaling. The antennae may be arranged into arrays covering the first and/or second face 3, 4 based on any two-dimensional lattice type.

First Example of an Antenna Stack

Referring also to FIG. 7, a first example of an antenna stack 22 (hereinafter the "first stack") is shown.

The first stack 22 includes a planar substrate 2. A first ground plane layer 23 is formed or supported on the first face 3. A first antenna dielectric layer 24 is formed or supported over the first ground plane layer 23. A first conductor layer 25 is formed or supported on the first antenna dielectric layer 24. Similarly, a second ground plane layer 26, second antenna dielectric layer 27 and second conductor layer 28 are formed and/or supported in order on the second face 4. Further, intermediate layers may be provided, for example, to improve inter-layer adhesion.

The first antennae $Rx_1, \ldots, Rx_N$ are formed by patterning the first conductor layer 25. Connecting elements of the circuit 7 such as microstrip lines, conductive traces and so forth are also patterned into the first conductor layer 25. One or more circuit 7 components may be formed or supported one the first conductor layer 25. For example, FBAR filters may be formed on the first conductor layer 25 and/or discrete components/integrated circuits may be bonded (e.g. flip-chip bonded) to connecting elements of the first conductor layer 25. Similarly, the second antennae $Tx_1, \ldots, Tx_M$ are formed by patterning the second conductor layer 28. Connecting elements and optionally circuit 7 components may be patterned into, formed or supported on the second conductor layer 28 in the same way as the first conductor layer 25.

Connections between the first and second conductor layers 25, 28 are provided by through-thickness vias 8 which connect between the first and second faces 3, 4. The vias may be formed by backfilling of holes drilled in the substrate 2. The vias also pass through the antenna dielectric layers 24, 27. The vias 8 connecting the first and second conductor layers 25, 28 are electrically isolated from the ground plane layers 23, 26 by apertures 29 patterned into the ground plane layers 23, 26. One or more other vias (not shown) may extend through the substrate 2 to connect between the ground plane layers 23, 26 to ensure a common ground potential.

In other examples, the ground plane layers 23, 26 may be patterned so as to only provide ground plane conductors directly corresponding to radiating surfaces of antennae (and connections thereto). Patterning of the ground plane layers 23, 26 may be preferable if the wireless transceiver 1 should be transparent, although alternatively ground plane layers 23, 26 could be formed from transparent conductors such as polymers, indium tin oxide (ITO) or similar conductive oxides. In some examples, the antenna dielectric layers 24, 27 may cover all, or substantially all, of the first and second faces 3, 4. However, in other examples the antenna dielectric layers 24, 27 may be patterned or deposited so that the antenna dielectric layers 24, 27 are only present where needed to separate radiation and ground elements of the first and/or second antennae $Rx_n$, $Tx_m$.

As described hereinbefore, the planar substrate 2 may be formed from a material which exhibits significant dielectric losses, because RF signals are transmitted using vias 8 instead of radiatively through the thickness t. When lossy materials such as glass or transparent polymers are used, the antenna dielectric layers 24, 27 should be formed from a dielectric material having a loss tangent tan(δ) (in which δ is loss angle) which is less than a loss tangent tan(δ) of the planar substrate 2 (effective, overall loss-tangent tan(δ) when the substrate 2 is a laminate). Unlike the planar substrate 2, the dielectric loss characteristics of the materials used for antenna dielectric layers 24, 27 should be considered and minimised.

In this way, the wireless transceiver may utilise low-loss dielectric materials for the antenna dielectric layers 24, 27, whilst the direct, hard wired connections between the antennae $Rx_n$, $Tx_m$ and the components of the circuit 7 (using vias 8, micro-strip lines and so forth) mean that the planar substrate 2 is not required to be formed from low-loss materials, and may instead be formed from relatively high dielectric-loss materials such as silica glass and/or polymers. This may reduce the cost and manufacturing complexity, for example by enabling use of high-loss but flexible polymer films suitable for roll-to-roll manufacturing methods.

The antenna dielectric layers 24, 27 may include, or be formed from, one or more of inorganic oxides, silica, alumina, an organic material, a fluoropolymer, polytetrafluoroethylene and nanocomposite. Each antenna dielectric layer 24, 27 may take the form of a film having a thickness of between and including 1 μm and 1 mm.

The material of either or both antenna dielectric layers 24, 27 may include amorphous and/or crystalline regions of the same material. Where the material of either or both antenna dielectric layers 24, 27 exhibits polymorphism, the material may include two or more different polymorphs, and optionally amorphous material. The materials for forming the antenna dielectric layers 24, 27 are not limited to these specific examples, although preferably the antenna dielectric layers 24, 27 should have loss-tangents tan(δ) of less than or equal to $10^{-3}$ at a frequency of 28 GHz. More preferably, the antenna dielectric layers 24, 27 may have loss-tangents tan(δ) of less than or equal to $10^{-4}$, $10^{-5}$ or $10^{-6}$ at a frequency of 28 GHz. Since it is not important for the operation of the first stack 22, the planar substrate 2 may have a loss tangent of greater than or equal to $10^{-3}$ at a frequency of 28 GHz.

Microstrip lines (not shown) connecting to first antennae $Rx_n$ and/or components of the circuit 7 supported on the first face 3 may be connected to microstrip lines connecting to second antennae $Tx_m$ and/or components of the circuit 7 supported on the second face 4 by vias 8 which are configured for impedance matching with the microstrip lines.

Second Example of an Antenna Stack

Figure 8:
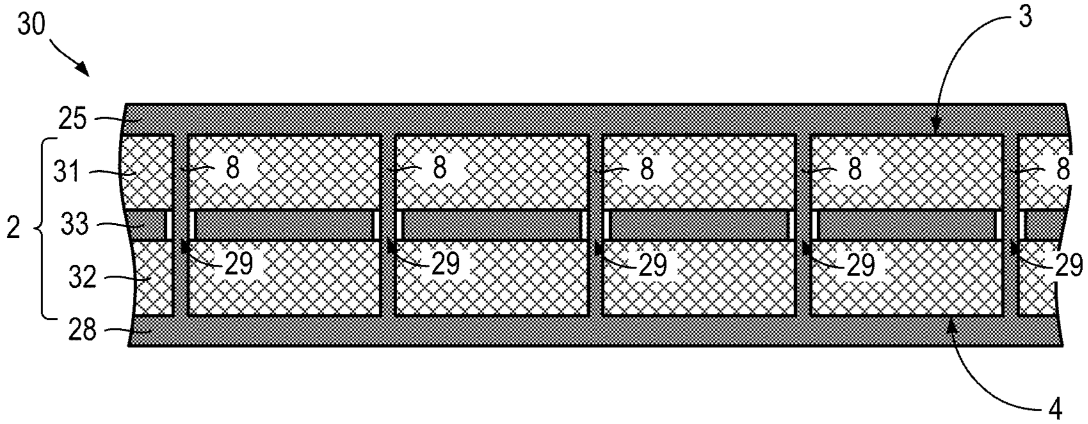
FIG. 8 is a schematic cross-section of a second example of an antenna stack.

Referring also to FIG. 8, a second example of an antenna stack 30 (hereinafter the "second stack") is shown.

The second stack 30 includes a planar substrate 2 in the form of a laminate of a first layer 31 and a second layer 32 bonded to sandwich a common ground plane layer 33. The common ground plane layer 33 may be deposited onto either the first layer 31 or the second layer 32. Alternatively, the common ground plane 33 may be a free-standing layer, for example a conductive sheet or foil, bonded between the first and second layers 31, 32. The first and second conductor layers 25, 28 are patterned over the respective first and second faces 3, 4 in the same way described for the first stack 22.

Unlike the first stack 22, the dielectric materials of the planar substrate 2 of the second stack 30 may require more careful consideration. In particular, the efficiency of antennae $Rx_n$, $Tx_m$ defined between the conductor layers 25, 28 and the common ground plane 33 may suffer if high dielectric loss materials are used for the first and second layers 31, 32. This may be mitigated by using thin first and second layers 31, 32, for example, thin polymer layers. The second stack 30 may particularly useful for wireless transceivers 1 in which at least the portions providing the phased arrays 5, 6 are flexible.

Similarly to the ground plane layers 23, 26, the common ground plane layer 33 includes apertures 29 for passage of vias 8. Alternatively, the common ground plane layer 33 may be patterned in the same way described for the ground plane layers 23, 26.

Third Example of an Antenna Stack

Figure 9:
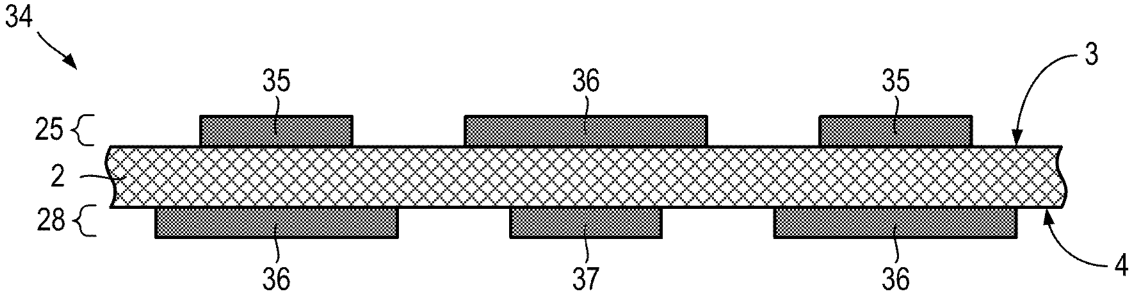
FIG. 9 is a schematic cross-section of a third example of an antenna stack.

Referring also to FIG. 9, a third example of an antenna stack 34 (hereinafter the "third stack") is shown.

The third stack 34 includes a planar substrate 2 having a first face 3 which supports the first conductor layer 25 and a second face 4 which supports the second conductor layer 28. Sections of the first conductor layer 25 providing radiating conductors 35 of first antennae $Rx_n$ may be opposed across the substrate 2 by ground electrodes 36 defined in the second conductor layer 28. Similarly, sections of the second conductor layer 28 providing radiating conductors 37 of second antennae $Tx_m$ may be opposed across the substrate 2 by ground electrodes 36 defined in the first conductor layer 25.

Similarly to the second stack 30, the efficiency of antennae $Rx_n$, $Tx_m$ defined across the substrate 2 may suffer if high dielectric loss materials are used for the substrate 2. This may be mitigated using thinner substrates.

Although not shown in FIG. 9, vias 8 still connect between the first and second conductor layers 25, 28 in the third stack 34, for example, to pipe RF signals from the first antennae $Rx_n$ to components of the circuit 7 supported on or over the second face 4.

Circuit for Analog Beamforming and Beamsteering

The beamforming and beamsteering of the wireless transceiver 1 may be implemented in the analog domain.

Figure 10:
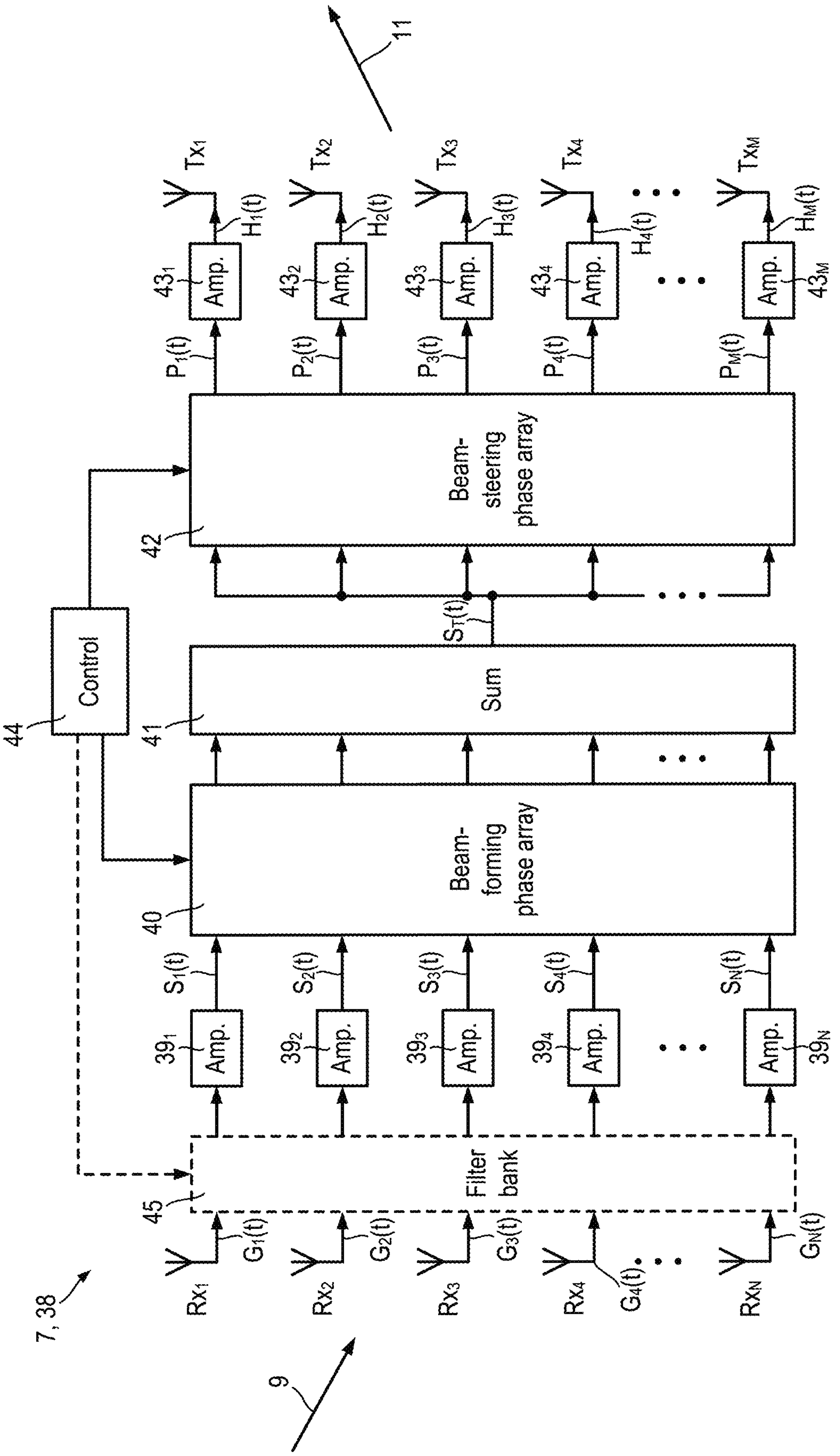
FIG. 10 is a schematic block diagram of a circuit for providing analog beamforming and beamsteering.

Referring also to FIG. 10, an example of a circuit 7 in the form of an analog circuit 38 is shown.

The analog circuit 38 is configured for analog beamforming of the first phased array 5 and analog beamsteering of the second phased array 6. The analog circuit 38 receives and re-transmit the radio signals 9, 11 without conversion to the digital domain.

The analog circuit 38 includes a bank of low noise amplifiers 39, a beamforming phase array 40, a signal summer 41, a beamsteering phase array 42, a bank of transmission amplifiers 43 and a controller 44.

When a radio signal 9 is incident on the first phased array 5 of N first antennae $Rx_1, \ldots, Rx_N$, a respective received electrical signal $G_1(t), \ldots, G_n(t), \ldots, G_N(t)$ is induced in each. The received electrical signal $G_1(t), \ldots, G_n(t), \ldots, G_N(t)$ are received by respective low noise amplifiers $39_1, \ldots, 39_n, \ldots, 39_N$, each of which outputs a corresponding amplified signal $S_1(t), \ldots, S_n(t), \ldots, S_N(t)$. Optionally, the received electrical signals $G_1(t), \ldots, G_n(t), \ldots, G_N(t)$ may be pre-processed using a filter bank 45. The filter bank 45 may include signal conditioning filters, for example, to remove signals falling outside of an expected or intended frequency band.

The beamforming phase array 40 applies a slightly different delay $\alpha_1, \ldots, \alpha_n, \ldots, \alpha_N$ to each of the N amplified signal $S_1(t), \ldots, S_n(t), \ldots, S_N(t)$. For example, the first amplified signal $S_1(t)$ is delayed by an amount $\alpha_1$ so that the corresponding output is $S_1(t+\alpha_1)$, the $n^{th}$ of N amplified signals is delayed by an amount $\alpha_n$ so that the corresponding output is $S_n(t+\alpha_n)$, and so forth for each amplified signal $S_1(t), \ldots, S_n(t), \ldots, S_N(t)$. The delays $\alpha_1, \ldots, \alpha_n, \ldots, \alpha_N$ are controlled by the controller 44 to provide steering of the direction $(\theta_R, \varphi_R)$ of the central axis of the radiation pattern of the first phased array 5 will experience maximum constructive interference.

The delayed amplified signals $S_1(t+\alpha_1), \ldots, S_n(t+\alpha_n), \ldots, S_N(t+\alpha_N)$ are summed by the signal summer 41 to produce a summed signal $S_T(t)$:

$$S_T(t) = \sum_{n=1}^{N} S_n(t + a_n) \quad (1)$$

Combined with the delays $\alpha_1, \ldots, \alpha_n, \ldots, \alpha_N$ applied to each of the N amplified signals $S_1(t), \ldots, S_n(t), \ldots, S_N(t)$, the effect of the summation is that contributions to the summed signal $S_T(t)$ from radio signals 9 arriving at, or close, to the direction $(\theta_R, \varphi_R)$ of first phased array 5 will combine constructively, whereas contributions from radio signals 9 arriving from significantly different angles will interfere destructively and be substantially attenuated.

The beamsteering phase array 42 receives the summed signal $S_T(t)$, and splits it into a number M of output signals $P_1(t), \ldots, P_m(t), \ldots, P_M(t)$, each corresponding to one of the second antennae $Tx_1, \ldots, Tx_m, \ldots, Tx_M$. Each output signal $P_1(t), \ldots, P_m(t), \ldots, P_M(t)$ is generated by applying a different delay $\beta_1, \ldots, \beta_m, \ldots, \beta_M$ to the summed signal $S_T(t)$. For the $m^{th}$ of M output signals $P_m(t)$:

$$P_m(t) = S_T(t + \beta_m) \quad (2)$$

The delays $\beta_1, \ldots, \beta_m, \ldots, \beta_M$ are controlled by the controller 44 to steer the direction $(\theta_T, \varphi_T)$ of the second phased array 6 for transmission of the outgoing radio signals 11.

Each of the output signals $P_1(t), \ldots, P_m(t), \ldots, P_M(t)$ is received by respective transmission amplifier $43_1, \ldots, 43_m, \ldots, 43_M$, which outputs a corresponding transmission signal $H_1(t), \ldots, H_m(t), \ldots, H_M(t)$. Each transmission signal $H_1(t), \ldots, H_m(t), \ldots, H_M(t)$ is received by the respective second antennae $Tx_1, \ldots, Tx_m, \ldots, Tx_M$, causing it to radiate electromagnetic waves. The delays $\beta_1, \ldots, \beta_m, \ldots, \beta_M$ result in the electromagnetic waves emitted by the second antennae $Tx_1, \ldots, Tx_m, \ldots, Tx_M$ being cancelled or at least attenuated by destructive interference, except at or close to the intended direction $(\theta_T, \varphi_T)$ of the second phased array 6 where there is constructive interference. The net result is that the outgoing radio signals 11 are directed about the orientation $(\theta_T, \varphi_T)$ of the second phased array 6 set by the controller 44 using the delays $\beta_1, \ldots, \beta_m, \ldots, \beta_M$.

The controller 44 may take the form of a microcontroller, one or more digital electronic processors, a field-programmable gate array, one or more phase arrays, one or more phase detectors, one or more phase shifters, or any other device suitable for controlling the delays $\alpha_1, \ldots, \alpha_n, \ldots, \alpha_N$ for beamforming and the delays $\beta_1, \ldots, \beta_m, \ldots, \beta_M$ for beamsteering.

Circuit for Digital Beamforming and Beamsteering

The beamforming and beamsteering of the wireless transceiver 1 may be implemented in the digital domain, for example using methods from the area of software defined radios.

Figure 11:
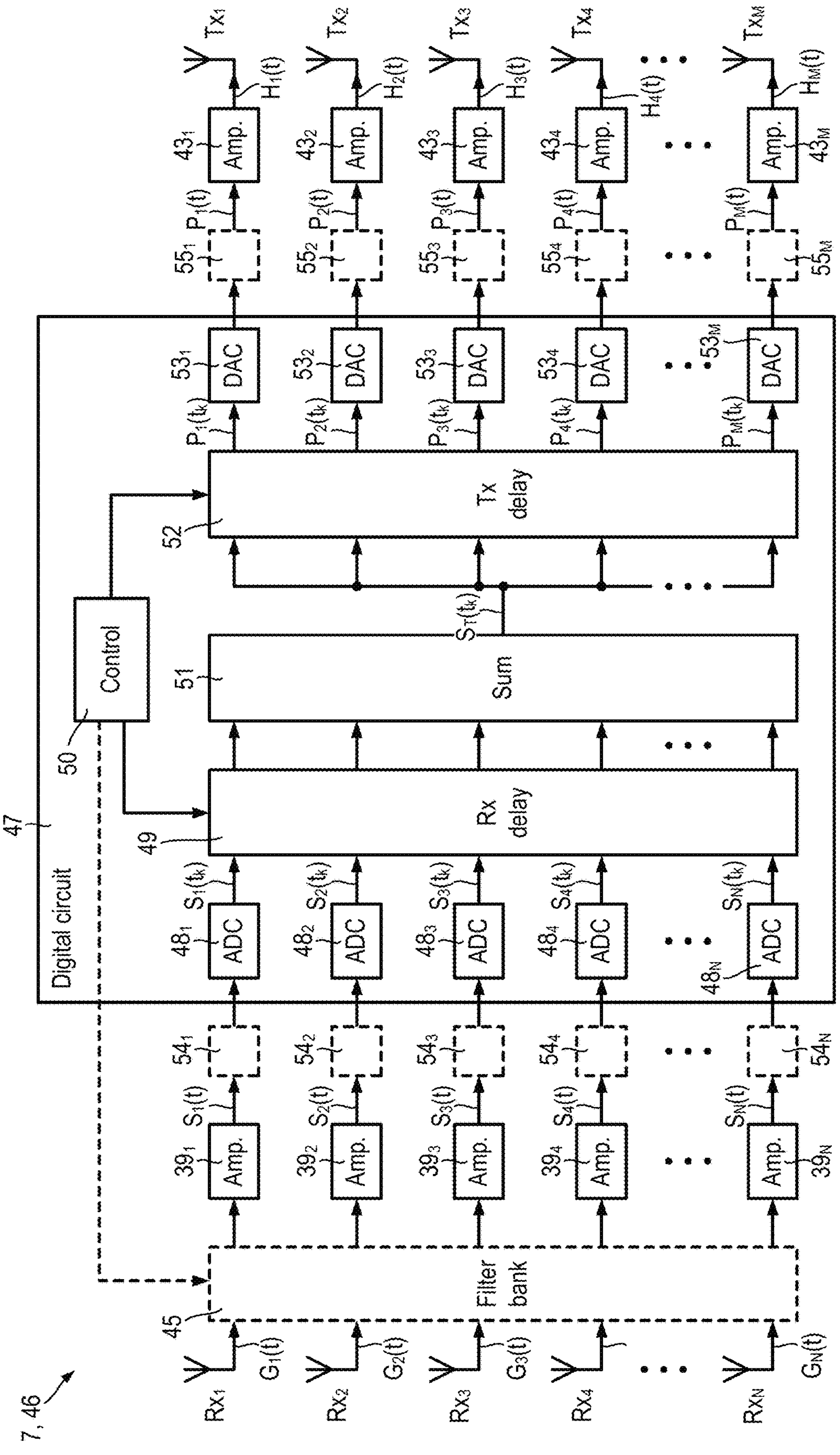
FIG. 11 is a schematic block diagram of a circuit for providing digital beamforming and beamsteering.

Referring also to FIG. 11, an example of a circuit 7 in the form of a second circuit 46 including a digital circuit 47 is shown.

The second circuit 46 includes a bank of low-noise amplifiers $\mathbf{39}_1, \ldots, \mathbf{39}_n, \ldots, \mathbf{39}_N$ connected to the first phased array 5 of N first antennae $Rx_1, \ldots, Rx_n, \ldots, Rx_N$, which convert an incoming radio signal 9 into the N amplified signals $S_1(t), \ldots, S_n(t), \ldots, S_N(t)$ in the same way as for the analog circuit 38. The digital circuit 47 is configured for digital beamforming of the amplified signals $S_1(t), \ldots, S_n(t), \ldots, S_N(t)$ from the first phased array 5, and also to perform digital beamsteering of the second phased array 6 by outputting the M output signals $P_1(t), \ldots, P_m(t), \ldots, P_M(t)$. In the same way as the analog circuit 38, the second circuit 46 also includes a bank of transmission amplifiers $\mathbf{43}_1, \ldots, \mathbf{43}_m, \ldots, \mathbf{43}_M$ which amplify the output signals $P_1(t), \ldots, P_m(t), \ldots, P_M(t)$ and provide transmission signals $H_1(t), \ldots, H_m(t), \ldots, H_M(t)$ to the second antennae $Tx_1, \ldots, Tx_m, \ldots, Tx_M$. The second circuit 46 provides a digital channel corresponding to each of the N first antennae $Rx_1, \ldots, Rx_N$, and a digital channel corresponding to each of the M second antennae $Tx_1, \ldots, Tx_M$.

Each of the amplified signals $S_1(t), \ldots, S_n(t), \ldots, S_N(t)$ is received by a respective analog-to-digital converter (ADC) $\mathbf{48}_1, \ldots, \mathbf{48}_n, \ldots, \mathbf{48}_N$ of the digital circuit 47. The ADCs $\mathbf{48}_1, \ldots, \mathbf{48}_n, \ldots, \mathbf{48}_N$ sample the amplified signals $S_1(t), \ldots, S_n(t), \ldots, S_N(t)$ with a sampling interval of $\delta t$. Whilst the digital circuit 47 will operate continuously in use, purely for illustration of the explanations hereinafter, let a digital sampling of the $n^{th}$ amplified signal at a time $t=k\cdot\delta t$ be denoted $S_n(t_k)$ (with k an integer).

A beamforming delay block 49 applies delays $\alpha_1, \ldots, \alpha_n, \ldots, \alpha_N$ to the digitised input signals $S_1(t_k), \ldots, S_n(t_k), S_N(t_k)$ for beamforming. For example, the delays $\alpha_1, \ldots, \alpha_n, \ldots, \alpha_N$ may be integer multiples of the sampling interval $\delta t$ of the ADCS $\mathbf{48}_1, \ldots, \mathbf{48}_N$.

Alternatively, if finer precision is required, then interpolation between one or more prior samplings may be used. For example, each channel may include a buffer of the last several samplings, e.g. three previous samplings $\{S_n(t_k), S_n(t_{k-1}), S_n(t_{k-2}), S_n(t_{k-3})\}$, and a polynomial interpolant may be used to shift each digital sampling to an estimated value corresponding to a delay $\alpha_n$ which does not corresponding to an integer number of sampling intervals. Preferably, the ADCs $\mathbf{48}_1, \ldots, \mathbf{48}_N$ sample at a rate $1/\delta t$ that permits using integer multiples of the sampling interval, as this will be more accurate and less computationally intensive. The delays $\alpha_1, \ldots, \alpha_n, \ldots, \alpha_N$ are controlled by a controller 50 of the digital circuit 47.

The delayed signals $S_1(t_k+\alpha_1), \ldots, S_N(t_k+\alpha_n), S_N(t_k+\alpha_N)$ are summed by a summing block 51 to generate a digitised summed signal $S_T(t_k)$.

Figure 12:
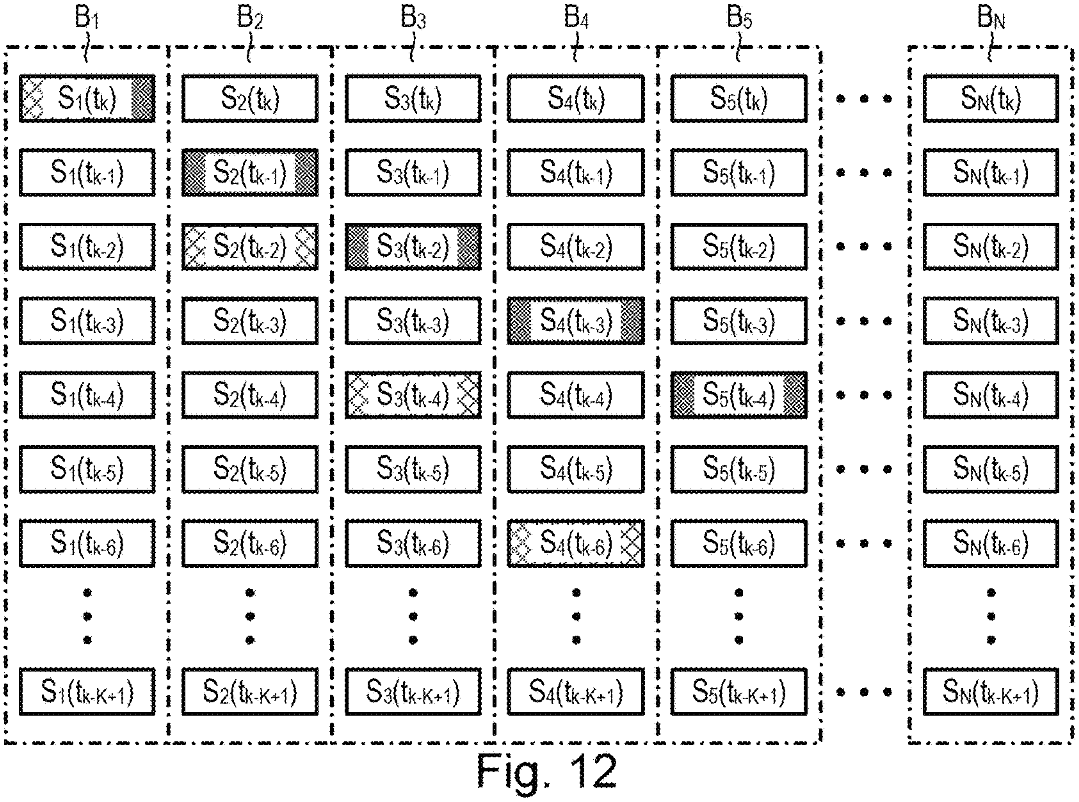
FIG. 12 schematically illustrates data buffers used in some implementations of the circuit of FIG. 11.

Referring also to FIG. 12, in some examples the beamforming block 49 and the summing block 51 may be implemented in an integrated way using a buffer $B_1, \ldots, B_n, \ldots, B_N$ corresponding to each input channel and storing a number K of samplings of the amplified signals $S_1(t), \ldots, S_n(t), \ldots, S_N(t)$. For example, if the most recent sampling is the $k^{th}$, then the $n^{th}$ of N buffers $B_n$ stores samples $B_n=\{S_n(t_k), S_n(t_{k-1}), \ldots, S_n(t_{k-K+1})\}$. The beamforming operation can then be performed by selecting samples with appropriate delays from each of the N buffers $B_1, \ldots, B_n, \ldots, B_N$ and summing them. For one example orientation of the first phased array 5, the digitised summed signal $S_T(t_k)$ may be generated by summing:

$$S_T(t_k) = \sum_{n=1}^{N} S_n(t_{k-n+1}) \tag{3}$$

this example is illustrated by the grey shading in FIG. 12. If N>K, the sum may simply be truncated. Different delays may be used, for a second example orientation of the first phased array 5, the digitised summed signal $S_T(t_k)$ may be generated by summing:

$$S_T(t_k) = \sum_{n=1}^{N} S_n(\tau_{k-2(n-1)}) \tag{4}$$

this example is illustrated by the hatching in FIG. 12. Again, the sum can simply be truncated once the index 2(n−1) exceeds K−1. Sums need not include every buffer, for example, yet another orientation may correspond to:

$$S_T(t_k) = \sum_{n=1}^{N/2} S_{2n-1}(t_{k-n+1}) \tag{5}$$

this example is not illustrated in FIG. 12, and would correspond to summing $S_1(t_k)$, $S_3(t_{k-1})$, $S_5(t_{k-2})$ and so forth. Using the buffers $B_1, \ldots, B_m, \ldots, B_M$, two or more sums could be calculated concurrently, enabling two "virtual" directional antennas to receive in parallel using a single array 6 of first antennae $Rx_1, \ldots, Rx_n, \ldots, Rx_N$.

Referring again to FIG. 11, a beamsteering delay block 52 generates M digitised output signals $P_1(t_k), \ldots, P_m(t_k), \ldots, P_M(t_k)$ by applying delays $\beta_1, \ldots, \beta_m, \ldots, \beta_M$ to the digitised summed signal $S_T(t_k)$. When the delays $\beta_1, \ldots, \beta_m, \ldots, \beta_M$ correspond to integer multiples of the sampling interval $\delta t$, the beamsteering delay block 52 may be implemented simply using a buffer storing a number K2 of values of the digitised summed signal $S_T(t_k)$, i.e. $\{S_T(t_k), S_T(t_{k-1}), S_T(t_{k-K2+1})\}$ to output delayed values. For delays $\beta_1, \ldots, \beta_m, \ldots, \beta_M$ which do not correspond to integer multiples of the sampling interval $\delta t$, a buffer combined with polynomial interpolation may be used.

The digitised output signals $P_1(t_k), \ldots, P_m(t_k), \ldots, P_M(t_k)$ are converted into the analog output signals $P_1(t), \ldots, P_m(t), \ldots, P_M(t)$ by respective digital-to-analog-converters (DAC) $\mathbf{53}_1, \ldots \mathbf{53}_m, \ldots, \mathbf{53}_M$.

The digital implementation of beamforming and beamsteering requires ADCs 48 and DACs 53 with very high bandwidth. An alternative implementation would be to omit the beamforming and beamsteering delay blocks 49, 52, and instead of synchronising the ADCs 48 and DACs 53 to a single time, the controller 50 could control the ADCs 48 to sample at staggered times to implement the beamforming delays $\alpha_1, \ldots, \alpha_n, \ldots, \alpha_N$, and similarly for the DACs 53.

Additionally or alternatively, the second circuit 46 may include a down-converter $\mathbf{54}_1$, $\mathbf{54}_n$, . . . , $\mathbf{54}_N$ in each input channel, configured to convert the amplified signals $S_1(t), \ldots, S_N(t)$ from a transmit band to baseband prior to sampling. Similarly, the second circuit may also include up-converters $\mathbf{55}_1, \ldots, \mathbf{55}_m, \ldots, \mathbf{55}_M$ in each output channel to convert the outputs of the digital circuit 47 from baseband back to the transmit band. Converting to baseband for the digital processing reduces the bandwidth requirements for the ADCs 48 and DACs 53. Examples of down-converters 54 and up-converters 55 may include heterodyne circuits utilising local oscillators.

Circuit for Hybrid Beamforming and Beamsteering

The beamforming and beamsteering of the wireless transceiver 1 may be implemented partly in the analog domain and partly in the digital domain.

Figure 13:
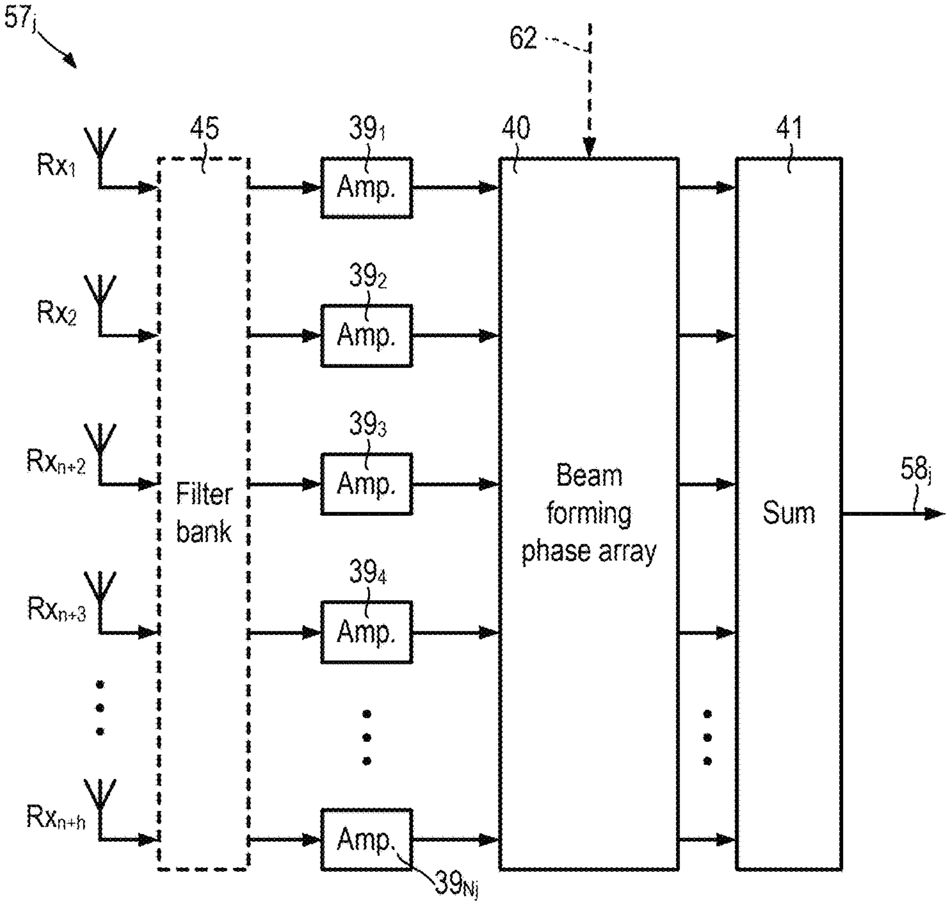
FIG. 13 is a schematic block diagram of a first, receiving, sub-array used in the circuit of FIG. 14.
Figure 14:
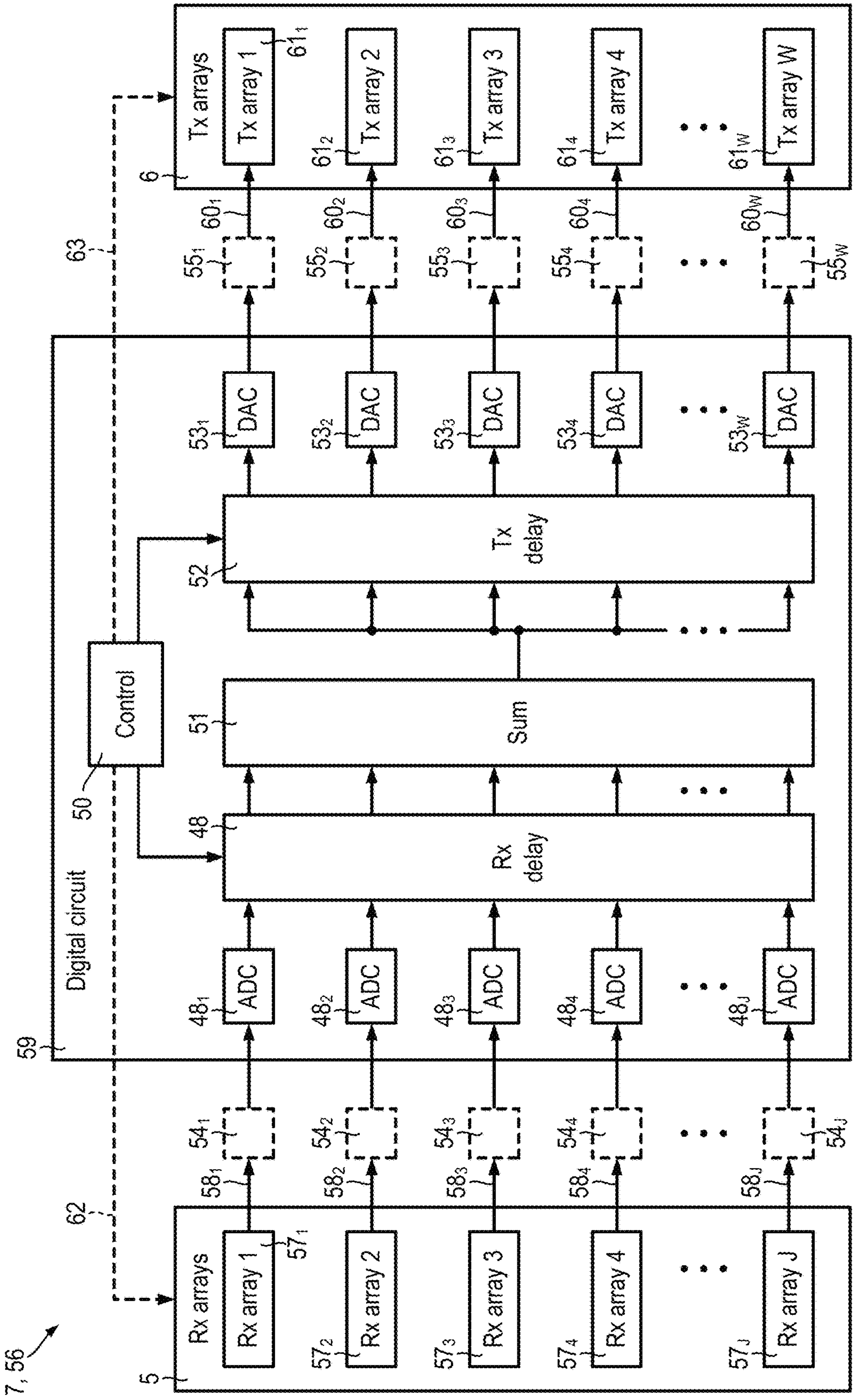
FIG. 14 is a schematic block diagram of a circuit for providing a hybrid of analog and digital beamforming and beamsteering.
Figure 15:
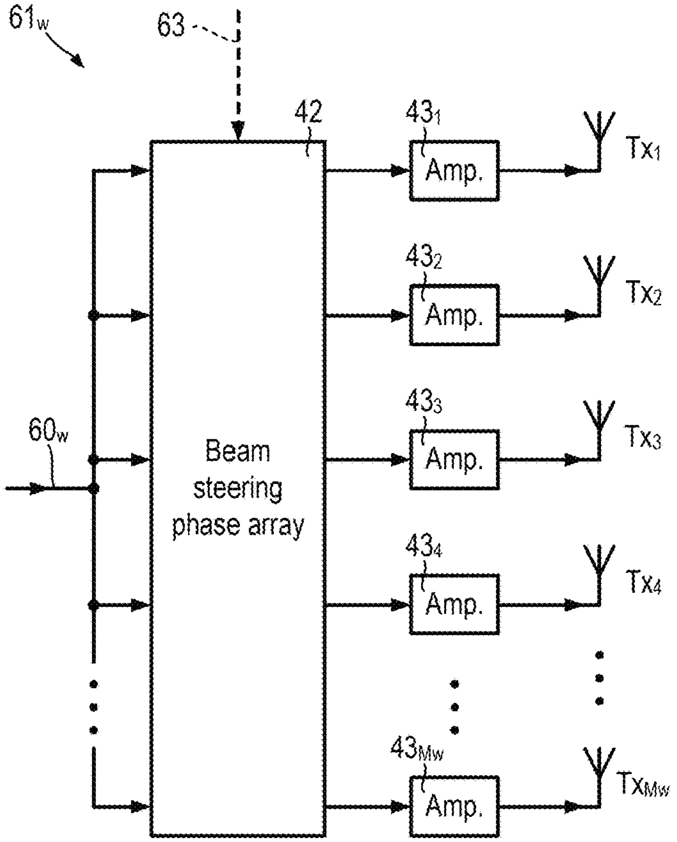
FIG. 15 is a schematic block diagram of a second, transmitting, sub-array used in the circuit of FIG. 14.

Referring also to FIGS. 13 to 15, an example of a circuit 7 in the form of a hybrid circuit 56 is shown.

Referring in particular to FIG. 14, the N first antennae $Rx_1, \ldots, Rx_a, \ldots, Rx_N$ of the first phased array 5 are arranged into a number J of first sub-arrays $\mathbf{57}_1, \ldots, \mathbf{57}_j, \ldots, \mathbf{57}_J$. Each first sub-array $\mathbf{57}_j$ includes two or more of the first antennae $Rx_n$, and provides a corresponding aggregate received signal 58 to an input channel of a digital circuit 59. The digital circuit 59 is the same as the digital circuit 47, except that instead of performing digital beamforming on received signals $G_n(t)$, the digital circuit 59 is configured to perform digital beamforming on the J aggregate received signals $\mathbf{58}_1, \ldots, \mathbf{58}_j, \ldots, \mathbf{58}_J$. Similarly, the digital circuit 59 is configured to perform digital beamsteering to generate a number W of aggregate output signals $\mathbf{60}_1, \ldots, \mathbf{60}_w, \ldots, \mathbf{60}_W$. The M second antenna $Tx_1, \ldots, Tx_m, \ldots, Tx_M$ of the second phased array 6 are arranged into W second sub-arrays $\mathbf{61}_1, \ldots, \mathbf{61}_w, \ldots, \mathbf{61}_W$, each of which receives a respective aggregate output signal $\mathbf{60}_1, \ldots, \mathbf{60}_w, \ldots, \mathbf{60}_W$.

Referring in particular to FIG. 13, a first sub-array $\mathbf{57}_j$ is shown in more detail.

Each first sub-array $\mathbf{57}_j$ includes a number Nj of first antennae $Rx_1, \ldots, Rx_{Nj}$ and an analog circuit configured to perform analog beamforming on the received signals G(t) to generate the corresponding aggregate received signal $\mathbf{58}_j$. In FIG. 13, the first antennae $Rx_1, \ldots, Rx_{Nj}$ are numbered from 1 to Nj internally for the purpose of illustrating the first sub-array $\mathbf{57}_j$, but these represent only a portion of the overall number N of first antennae $Rx_1, \ldots, Rx_N$.

The analog circuit of the first sub-array $\mathbf{57}_j$ includes a low-noise amplifier $\mathbf{39}_1, \ldots, \mathbf{39}_{Nj}$ corresponding to each of the Nj first antennae $Rx_1, \ldots, Rx_{Nj}$, a beam forming phase array 40 and a signal summer 41, which are configured in the same way as the corresponding components of the analog circuit 38, except that the aggregate received signal $\mathbf{58}_j$ only corresponds to a sum over a sub-set of Nj out of the total of N received signals $G_1(t), \ldots, G_N(t)$. The delays $\alpha_1, \ldots, \alpha_{Nj}$ applied by the beam forming phase array 40 of the first sub-array $\mathbf{57}_j$ may be pre-set and fixed, or alternatively the delays $\alpha_1, \ldots, \alpha_{Nj}$ may be controlled by control signals 62 provided by the controller 44 of the digital circuit 59.

Referring in particular to FIG. 15, a second sub-array $\mathbf{61}_w$ is shown in more detail.

Each second sub array $\mathbf{61}_w$ includes a number Mw of second antennae $Tx_1, \ldots, Tx_{Mw}$ and an analog circuit configured to perform analog beamsteering on the aggregate output signal $\mathbf{60}_w$ to generate the corresponding transmission signals H(t) for transmission by the second antennae $Rx_1, \ldots, Rx_{Mw}$. In FIG. 15, the second antennae $Tx_1, \ldots, Tx_{Mw}$ are numbered from 1 to Mw internally for the purpose of illustrating the second sub-array $\mathbf{61}_w$, but these represent only a portion of the overall number M of second antennae $Tx_1, \ldots, Tx_M$.

The analog circuit of the second sub array 61*w* includes a beamsteering phase array 42 and a transmission amplifier $\mathbf{43}_1, \ldots, \mathbf{43}_{Mw}$ corresponding to each of the Mw second antennae $Tx_1, \ldots, Tx_{Mw}$, which are configured in the same way as the corresponding components of the analog circuit 38, except that output signals H(t) are only supplied to a sub-set of Mw out of the total of M second antennae $Tx_1, \ldots, Tx_M$. The delays $\beta_1, \ldots, \beta_{Mw}$ applied by the beamsteering phase array 42 of the second sub array $\mathbf{61}_w$ may be pre-set and fixed, or alternatively the delays $\beta_1, \ldots, \beta_{Mw}$ may be controlled by control signals 63 provided by the controller 44 of the digital circuit 59.

The hybrid circuit 56 may optionally include down-converters $\mathbf{54}_1, \ldots, \mathbf{54}_1$ and up-convertors $\mathbf{55}_1, \ldots, \mathbf{55}_w$ for each digital channel.

Using a hybrid circuit 56 may permit some of the flexibility of software defined radio, whilst reducing, compared to a purely digital approach, the number of ADCs 48 and DACs 53 required, and also the requirements for data processing capacity.

Wireless Transceiver for Duplex Relaying

The examples described hereinbefore have explained relaying signals 9 received at the first face 3 to be re-transmitted 11 from the second face 4. In practice, a wireless transceiver 1 will also need to relay radio signals in the other direction (from the second face 4 to the first face 3). This may be accomplished in a number of different ways.

For example, the circuit 7 may be configured to alternate between first and second periods. During the first period of each alternating cycle, the circuit 7 may control the first phased array 5 as described hereinbefore to receive radio signals 9, which are then re-transmitted as outgoing signals 11 by the second phased array 6. During the second period of each alternative cycle, the circuit 7 may reverse the direction so that the second phased array 6 receives radio signals 9, which are then re-transmitted as outgoing signals 11 by the first phased array 5. In this way, the first and second antennae $\mathbf{R1}_x, \ldots, Rx_N, Tx_1, \ldots, Tx_M$ may be time-multiplexed to function as transceivers. During the first period radio signals 9 are relayed in one direction, and during the second period the direction of relaying radio signals 9 is reversed. The alternating cycle of first and second periods is repeated whilst the device is active. The first and second periods may have the same, or different, lengths, depending on the requirements of an installation location.

Circuits 7 for duplex transmission may be provided by adapting and/or duplicating any of the examples described hereinbefore.

Alternatively, instead of time-multiplexing the usage of the first and second antennae $\mathbf{R1}_x, \ldots, Rx_N, Tx_1, \ldots, Tx_M$, dedicated receiving and transmitting antennae may be supported on both the first and second faces 3, 4.

Figure 16:
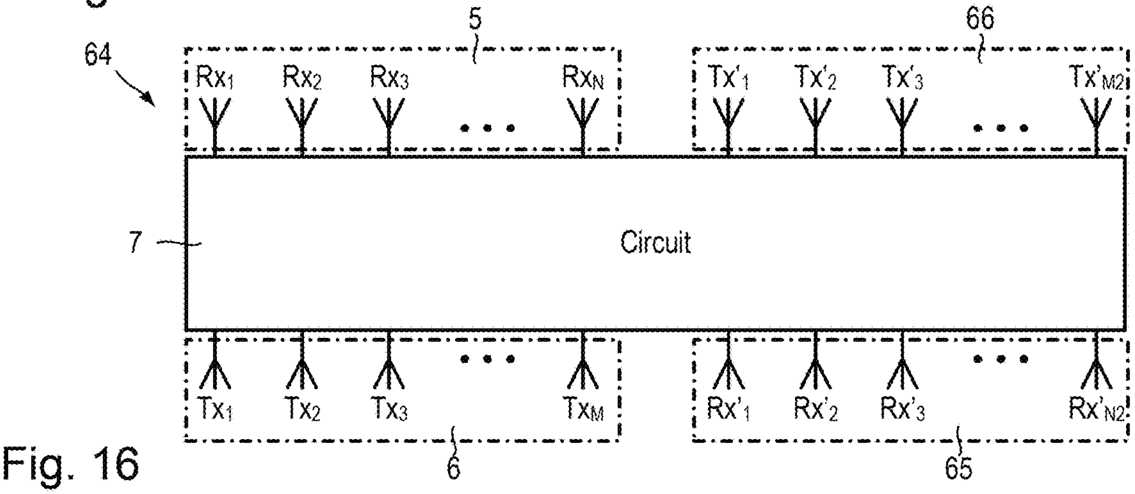
FIG. 16 schematically illustrates a second wireless transceiver.

Referring also to FIG. 16, a second wireless transceiver 64 is shown.

The second wireless transceiver 64 includes the first and second phased arrays 5, 6 as described hereinbefore. The second wireless transceiver 64 also includes a number N2 of third antennae $Rx'_1, \ldots, Rx'_{N2}$ supported on the second face 4 and a number M2 of fourth antennae $Tx'_1, \ldots, Tx'_{M2}$ supported on the first face 3. In addition to relaying signals 9 from the first phased array 5 to the second phased array 6, the circuit 7 is additionally configured to control the N2 third antennae $Rx'_1, \ldots, Rx'_{N2}$ as a third phased array 65 to receive radio signals, and to control the M2 fourth antennae $Tx'_1, \ldots, Tx'_{M2}$, as a fourth phased array 66 to retransmit the radio signals received using the third phased array 65. Similarly to the second phased array 6, the third phased array 65 is directional and controllably orientable within a third range $\Delta\theta_3$ of acute angles to the normal 12 of the second face 4. Similarly to the first phased array 5, the fourth phased array 66 is directional and controllably orientable within a fourth range $\Delta\theta_4$ of acute angles to the normal 10 of the first face 3.

In this way, the second wireless transceiver 64 may relay radio signals from the first face 3 to the second face 4 using the first and second phased arrays 5, 6, and may relay signals in the opposite direction using the third and fourth phased arrays 65, 66. Circuits 7 for duplex transmission may be provided by adapting and/or duplicating any of the examples described hereinbefore.

Although shown as being grouped separately in FIG. 16, the first and fourth phased arrays 5, 66 need not correspond to physically separate regions of the first face 3.

Figure 17:
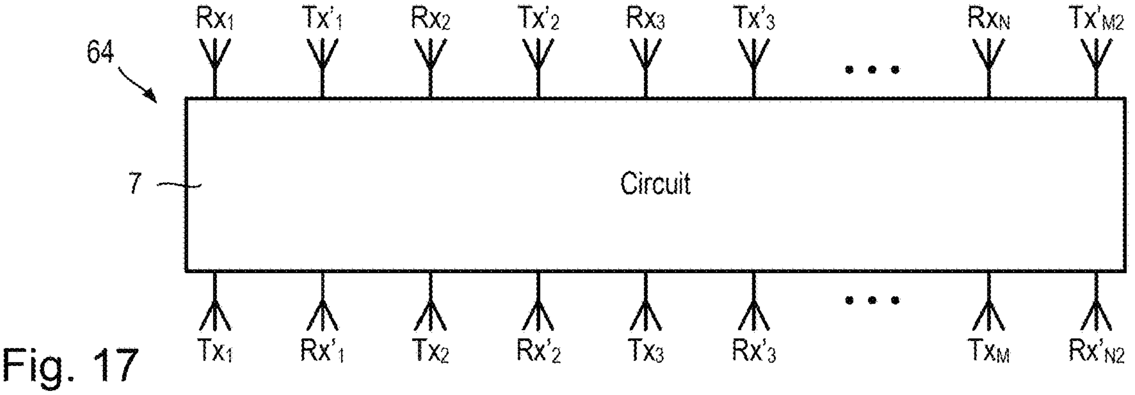
FIG. 17 schematically illustrates an alternative configuration of the second wireless transceiver of FIG. 16.

Alternatively, as shown in FIG. 17, the first antennae $Rx_1, \ldots, Rx_N$ may be interspersed with the fourth antennae $Tx'_1, \ldots, Tx'_{M2}$. Similarly, the second antennae $Tx_1, \ldots, Tx_M$ may be interspersed with the third antennae $Rx'_1, \ldots, Rx'_{N2}$.

Any of the example of duplex, or bi-directional, relaying may be configured such that radio signals transmitted away from the second face 4 have a lower power than radio signals transmitted away from the first face 3.

For example, the first face 3 may be oriented towards the outside of a building whilst the second face 4 is oriented towards an interior of the building. Using reduced power levels for radio signals retransmitted inside the building, compared to those required for transmission back to the wider external network, may reduce power consumption of a wireless transceiver 64. Using reduced power levels for signals retransmitted inside the building may reduce interference with other electronics devices and/or equipment inside the building. Using reduced power levels for signals retransmitted inside the building may provide reassurance to any building occupants/users concerned about the intensity of radio signals.

Radio Signal Selectivity in Frequency-Division Multiplexed Wireless Networks

Although the optional filter bank 45 has been described as providing signal conditioning functions, the filter bank may additionally or alternatively also provide the capability to select to relay radio signals 9 received from some wireless network service providers, whilst not relaying radio signals from other service providers.

Figure 18:
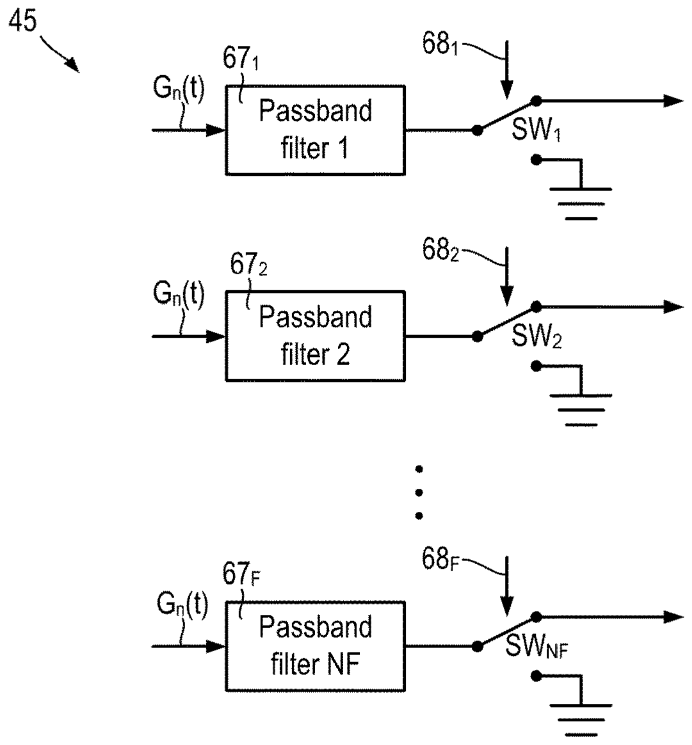
FIG. 18 is a schematic block diagram of a switchable filter bank.

Referring also to FIG. 18, a first example of a portion of the filter bank 45 is shown.

The filter bank 45 is part of the circuit 6, and in this example includes a number NF of passband filters $67_1, \ldots, 67_{NF}$, each defining a passbands for received signals $G_n(t)$ from an $n^{th}$ of N first antennae $Rx_1, \ldots, Rx_N$. Each passband filter $67_1, \ldots, 67_{NF}$ corresponds to a different service provider in a frequency multiplexed wireless communications network. Service providers may be mobile telephone service providers, data service providers, and so forth. The passband filters $67_1, \ldots, 67_{NF}$ may take the form of analog filters such as, for example, film bulk acoustic resonators, FBAR, thin-film bulk acoustic resonators, TFBAR, and so forth.

The filter bank 45 is configurable such that one or more of the passbands $67_1, \ldots, 67_{NF}$ may be disabled. For example, in the example shown in FIG. 18, the output of each passband filter $67_1, \ldots, 67_{NF}$ is switchable between onward processing and ground by a respective switch $SW_1, \ldots, SW_{NF}$. The circuit 7 may be configurable such that an output of each of the two or more passband filters $67_1, \ldots, 67_{NF}$ may be independently enabled or disabled in use. For example, each switch $SW_1, \ldots, SW_{NF}$ may be controlled by a control signal $68_1, \ldots, 68_{NF}$ supplied by a controller 44, 50 of the circuit 7.

In this way, an owner/installer of the wireless transceiver 1, 64 may control which service providers may use their infrastructure, and update this in use. For example, passbands corresponding to service providers who pay a subscription may be enabled whilst other passbands are disabled. Frequency bands used for emergency calls and/or by emergency services may be always enabled. In networks where different bands are allocated to the same service provider for voice calls and data services, the wireless transceiver 1, 64 may be configured to relays signals for voice calls at the same time that data services are disabled for that service provider.

The circuit 7 may be configured to receive passband modification messages (not shown) comprising instructions to enable one or more passbands and/or to disable one or more other passbands by shorting the outputs of the corresponding passband filters $67_1, \ldots, 67_F$. Passband modification messages may be received through a wireless network which the wireless transceiver 1, 64 forms a part or portion of, for example as radio signals. Passband modification messages may be received within a passband which is always enabled.

Alternatively, instead of using analog filtering, the passbands corresponding to different service providers may be provided by digital filters, for example provided as part of a digital circuit 47, 59.

Whilst passbands are preferably configurable in use, in other examples the circuit 7 may be configurable such that each of the two or more passbands is independently enabled or disabled in a one-time configuration process.

Figure 19:
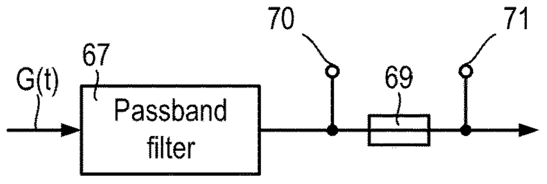
FIG. 19 is a schematic block diagram of a passband filter which may be disabled by blowing a fuse.

For example, referring also to FIG. 19, each passband may be provided by a corresponding passband filter 67 which is connected for onward processing via a fuse 69. A pair of terminals 70, 71 may be provided to either side of the fuse 69, to enable a one-time configuration by passing a high current between the terminals 70, 71 to blow the fuse 69 and disable the corresponding passband, whilst protecting surrounding portions of the circuit 7.

Figure 20:
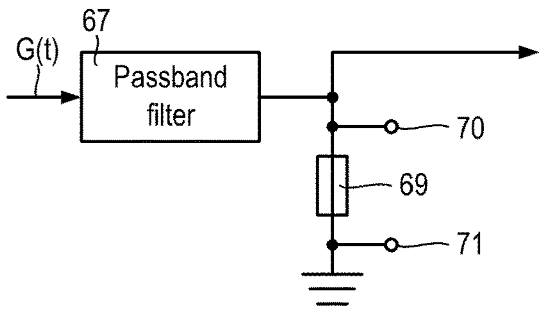
FIG. 20 is a schematic block diagram of a passband filter which may be enabled by blowing a fuse.

Alternatively, referring also to FIG. 20, the fuse 69 may initially short the output of passband filter 67 to ground, so that the fuse 69 must be blown in a one-time configuration step in order to enable the corresponding passband.

A one-time configuration process may also be applied to circuits 7 using digital filtering to provide passbands, for example, by programming a programmable read-only memory (programmable ROM).

Radio Signal Selectivity in Time-Division Multiplexed Wireless Networks

Selectivity of relaying radio signals need not be restricted to wireless networks utilising frequency-division multiplexing. A wireless transceiver 1, 64 may additionally or alternatively be configured to receive and retransmit radio signals within a time-multiplexed wireless communications system. The circuit 7 may be configurable to only retransmit radio signals 9 corresponding to one or more selected service providers.

The circuit 7 may be configured to identify the source of a received radio signal 9 using, for example, packet header data. Alternatively, if the time windows for different service providers are known, the circuit 7 may simply disable relaying during the time slots corresponding to non-selected service providers.

If the source of a received radio signal 9 corresponds to a selected service providers, for example a subscriber, then the circuit 7 will cause retransmission of that received radio signal 9 as an outgoing radio signal 11. Otherwise, the received radio signal 9 may not be retransmitted. Exceptions for emergency communications and/or emergency service users may be programmed into the wireless transceiver 1, 64.

The selected service providers may be updatable in use. For example, the circuit 7 may be configured to receive selected service provider modification messages (not shown) including instructions to enable retransmission of radio signals originating from one or more service providers and/or to disable retransmission of radio signals originating from one or more other service providers. Selected service provider modification messages (not shown) may be received through a wireless network which the wireless transceiver is a part of.

Modifications

It will be appreciated that many modifications may be made to the embodiments hereinbefore described. Such modifications may involve equivalent and other features which are already known in the design, manufacture and use of wireless transceivers, and which may be used instead of or in addition to features already described herein. Features of one embodiment may be replaced or supplemented by features of another embodiment. For example, features of one wireless transceiver be replaced or supplemented by features of other wireless transceivers and/or features of one antenna arrangement may be replaced or supplemented by features of other antenna arrangements.

Wireless transceivers 1, 64 have been described which include planar substrates 2. However, features described hereinbefore such as the selectivity of which radio signals to relay, may be applied to wireless transceivers (not shown) for which the first and second phased arrays 5, 6, and optionally the third and fourth phased arrays 65, 66, are not supported on opposite faces of a planar substrate. For example, the first and second phased arrays 5, 6 may be supported on a pair of faces oriented at an angle to one another for relaying radio signals 9 around corners.

In one particular example, a further wireless transceiver (not shown) may include N first antennae $Rx_1, \ldots, Rx_N$, M second antennae $Tx_1, \ldots, Tx_M$, and a circuit 7, 38, 47, 56. The circuit 7, 38, 47, 56 may be configured to control the N first antennae $Rx_1, \ldots, Rx_N$ as a first phased array 7 to receive incoming radio signals 9, and to control the M second antennae $Tx_1, \ldots, Tx_M$ as a second phased array 6 to transmit outgoing radio signals 11.

Like the wireless transceivers 1, 64 described hereinbefore, the first phased array 5 is directional and controllably orientable within a first range of angles $\Delta\theta_1$, though in this case the range is not restricted relative to a normal 10 of a first face 3 of a planar substrate 2. Similarly, the second phased array 6 is directional and controllably orientable within a second range of angles $\Delta\theta_2$ which is not bound relative to a normal 12 of a second face 4 of a planar substrate 2.

Analog Beamforming Using Varactor Diodes

In implementations of the analog circuit 38 shown in FIG. 10, the functions of the beamforming phase array 40 and the beamsteering phase array 42 in generating respective delays $\alpha_1, \ldots, \alpha_n, \ldots, \alpha_N, \beta_1, \ldots, \beta_m, \ldots, \beta_M$ may be provided by the variable capacitances of respective varactor diodes (also sometimes referred to as "varicaps").

Figure 21:
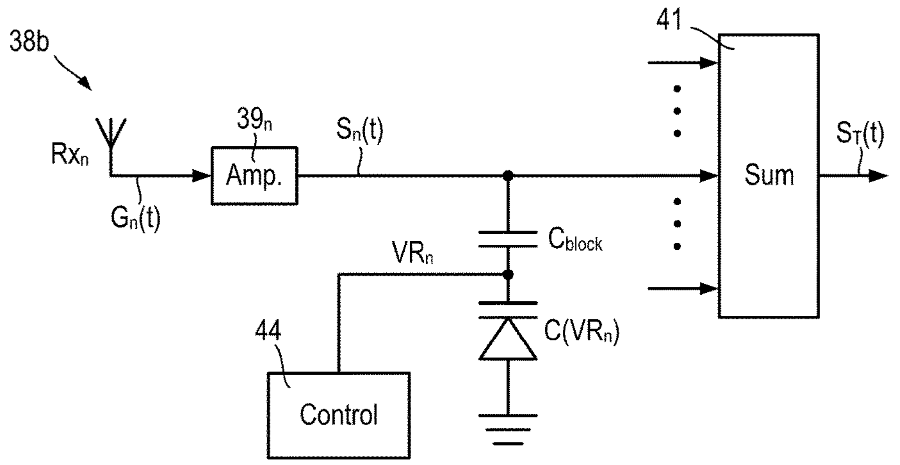
FIG. 21 is a schematic block diagram of a portion of a second circuit for providing analog beamforming and beamsteering.

For example, referring also to FIG. 21, a portion of a second analog circuit 38*b* is shown.

Although only the portion between receiving antennae $Rx_1, \ldots, Rx_n, \ldots, Rx_N$ and the signal summer 41 is shown in FIG. 21, the second analog circuit 38*b* is the same as the analog circuit 38, except that the beamforming phase array 40 takes the form of an array of N varactor diodes $C(VR_1), \ldots, C(VR_n), \ldots, C(VR_N)$, each having a variable capacitance $C(VR_n)$ which is a function of a corresponding reverse bias $VR_1, \ldots, VR_n, \ldots, VR_N$ controlled by the controller 44. The controller 44 may supply the reverse biases $VR_1, \ldots, VR_n, \ldots, VR_N$ directly, or may control one or more voltages sources (not shown) and/or amplifiers (not shown) which provide the reverse biases $VR_1, \ldots, VR_n, \ldots, VR_N$ to the varactor diodes $C(VR_1), \ldots, C(VR_n), \ldots, C(VR_N)$. Each varactor diode $C(VR_n)$ is arranged to inject an impedance $-i(\omega C(VR_n))^{-1}$ into the path of a corresponding signal $S_n(t)$ to provide the beamforming delay $\alpha_n$. Varactor diodes of the beamforming phase array 40 may be part of an integrated circuit flip-chip bonded to the substrate 2.

In the example shown in FIG. 21, each varactor diode $C(VR_n)$ is connected between system ground and the signal $S_n(t)$ path. The reverse bias $VR_n$ provided by the controller 44 is isolated from the signal $S_n(t)$ path by connecting the varactor diode $C(VR_n)$ in series with a blocking capacitance $C_{block}$. The blocking capacitance $C_{block}$ should be significantly larger than an upper bound (in use) of the varactor diode capacitance $C(VR_n)$, for example at least ten times. In this way, the total series capacitance will be dominated by the varactor diode capacitance $C(VR_n)$.

The configuration shown in FIG. 21 is exemplary, and any other circuit suitable for coupling the signal paths $S_1(t), \ldots, S_N(t)$ to corresponding varactor diodes $C(VR_1), \ldots, C(VR_N)$ may be used instead. In alternative implementations, each varactor diode $C(VR_n)$ could instead be connected to a signal path between the corresponding antenna $Rx_n$ and low noise amplifier $39_n$.

It will be appreciated that the blocking capacitance $C_{block}$ will not block transient signals when one or more of the reverse biases $VR_1, \ldots, VR_n, \ldots, VR_N$ are changed, for example when changing the orientation(s) $\theta_R$, $\theta_T$ for the first and/or second arrays 5, 6. However, the rate and frequency of changing the orientation(s) $\theta_R$, $\theta_T$ of the first and/or second arrays 5, 6 will be orders of magnitude below the carrier frequencies of RF signals 9, 11, and may be easily removed with filtering. Additionally or alternatively, the relaying of radio signals may be temporarily switched off during periods when the orientation(s) $\theta_R$, $\theta_T$ for the first and/or second arrays 5, 6 are being changed.

Additionally or alternatively, the beamsteering phase array 42 may include (or take the form of) an array of M varactor diodes. For example, referring also to FIG. 22, a portion of a third analog circuit 38*c* is shown.

Figure 22:
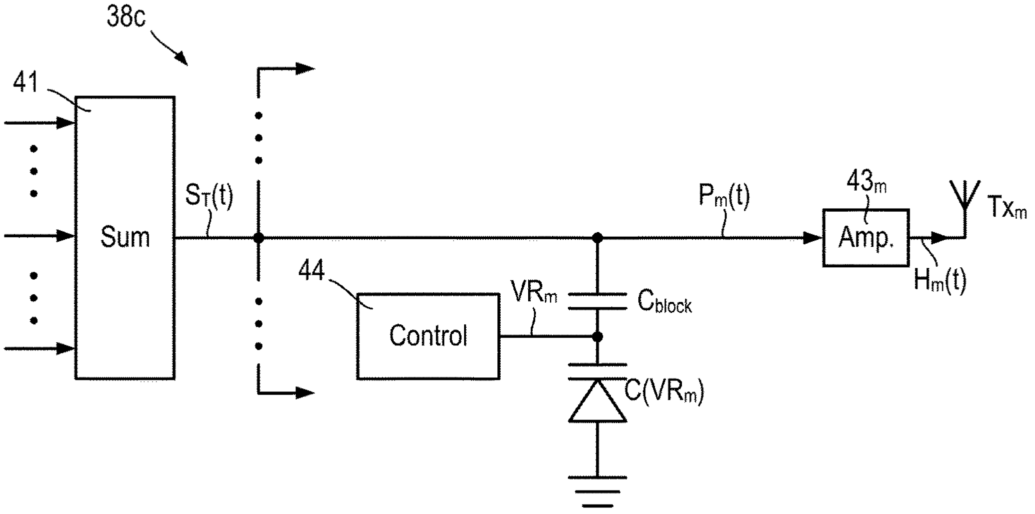
FIG. 22 is a schematic block diagram of a portion of a third circuit for providing analog beamforming and beamsteering.

Although only the portion between the signal summer 41 and the transmitting antennae $Tx_1, \ldots, Tx_m, \ldots, Tx_M$ is shown in FIG. 22, the second analog circuit 38*c* is the same as the analog circuit 38 and/or the second analog circuit 38*b*, except that the beamsteering phase array 42 takes the form of an array of M varactor diodes $C(VR_1)$, . . . , $C(VR_m)$, . . . , $C(VR_M)$, each having a capacitance $C(VR_m)$ which is a function of a corresponding reverse bias $VR_1$, . . . , $VR_m$, . . . , $VR_M$ supplied by the controller 44. The controller 44 may supply the reverse biases $VR_1$, . . . , $VR_m$, . . . , $VR_M$ directly, or may control one or more voltages sources (not shown) and/or amplifiers (not shown) which provide the reverse biases $VR_1$, . . . , $VR_m$, . . . , $VR_M$ to the varactor diodes $C(VR_1)$, . . . , $C(VR_m)$, . . . , $C(VR_M)$. Each varactor diode $C(VR_m)$ injects an impedance $-i(\omega C(VR_m))^{-1}$ which provides the beamforming delay $\beta_m$ into the summed signal $S_T(t)$ to provide the corresponding output signal $\beta_m(t)$. Varactor diodes of the beamsteering phase array 42 may be part of an integrated circuit flip-chip bonded to the substrate 2 (the same integrated circuit may provide varactor diodes for both the beamforming phase array 40 and the beamsteering phase array 42).

The configuration shown in FIG. 22 is exemplary, and any other circuit suitable for coupling the varactor diode capacitances $C(VR_1)$, . . . , $C(VR_M)$ into the summed signal $S_T(t)$ to provide the corresponding output signals $P_1(t)$, . . . , $P_M(t)$ may be used instead. In alternative implementations, each varactor diode $C(VR_m)$ could instead be connected at a point between the corresponding transmission amplifier $\mathbf{43}_m$ and the antenna $Tx_m$.

Figure 23:
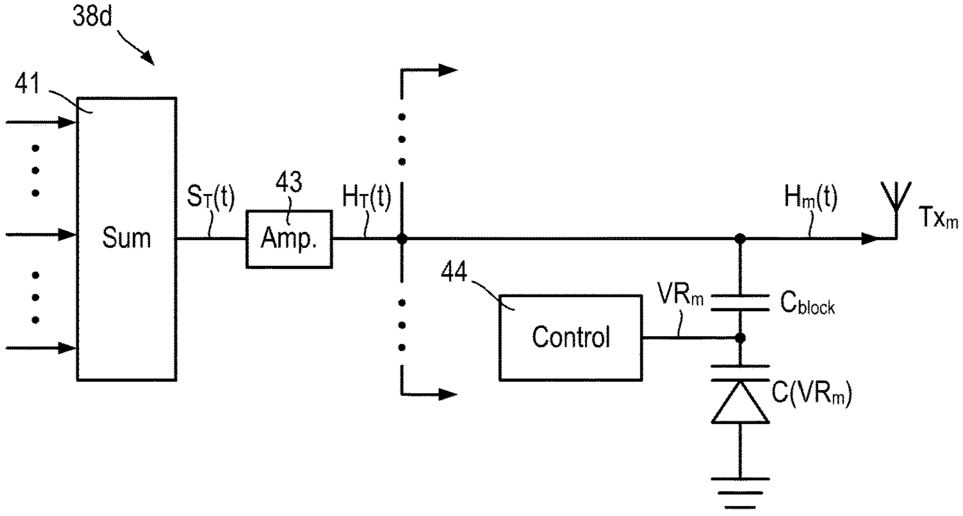
FIG. 23 is a schematic block diagram of a portion of a fourth circuit for providing analog beamforming and beamsteering.

Although examples have been described in which a number M of transmission amplifiers $\mathbf{43}_1$, . . . , $\mathbf{43}_M$ are used, the order of beamsteering and amplification may be reversed. For example, referring also to FIG. 23, a portion of a fourth analog circuit 38*d* is shown.

The fourth analog circuit 38*d* is the same as the third analog circuit 38*c*, except that the summed signal $S_T(t)$ is amplified by a single transmission amplifier 43 to output a base transmission signal $H_T(t)$. The base transmission signal $H_T(t)$ is subsequently split into M transmission channels, and the transmission signals $H_1(t)$, . . . , $H_M(t)$ for transmission by the antennae $Tx_1$, . . . , $Tx_M$ are generated by a beamsteering phase array 42 in the form of an array of M varactor diodes $C(VR_1)$, . . . , $C(VR_M)$.

Similarly, in some implementations (not shown) of the hybrid circuit 56, the beamforming phase arrays 40 of first sub-arrays 57 and/or the beamsteering phase arrays 42 of second sub-arrays 61 may be implemented using varactor diodes. In general, beamforming and/or beamsteering of any of the examples described hereinbefore may be implemented and/or replaced using varactor diodes C(VR) as described in relation to FIGS. 21 to 23.

The blocking capacitance $C_{block}$ connected in series with varactor diodes $C(VR_n)$, $C(VR_m)$ may be implemented supported on the first and/or second faces 3, 4 of the planar substrate 2. For example, by patterning areas of the first and/or second conductor layers 25, 28 and corresponding regions of the first, second or common ground plane layers 23, 26, 33. An additional dielectric (not shown) may be deposited in regions corresponding to blocking capacitances $C_{block}$, or an existing antenna dielectric layer 24, 27 may be used.

Wide Angle Reception

Wireless transceivers 1, 64 have been described which are configured to control a plurality of first antennae $Rx_1$, . . . , $Rx_N$ as a first phased array 5 and to control a plurality of second antennae $Tx_1$, . . . , $Tx_M$ as a second phased array 5. In other words, reception and transmission of signals are both direction.

However, the wireless transceivers 1, 64 may also be used with only directional transmissions. In other words, the wireless transceivers 1, 64 need not apply beamforming to the first phased array 5 and instead simply monitor the first antennae $Rx_1$, . . . , $Rx_N$ for received signals 9. Whilst beamforming to a particular direction permits detection of weaker signals originating in that direction, omitting to perform beamforming will allow the first antennae $Rx_1$, . . . , $Rx_N$ to detect signals from a wide range of angles (determined by the radiation/antenna patterns of the individual antennae, the spacing and so forth). Any received signals 9 may then be re-broadcast 11 in a particular transmission direction $\theta_T$ by beamsteering of the second phased array 6 as described hereinbefore.

Equally, the first antennae $Rx_1$, . . . , $Rx_N$ may be controlled as a first phased array 5 to receive from a particular direction, whilst the second antennae $Tx_1$, . . . , $Tx_M$ are not beamsteered and radiate across a wide range of angles (compared to beamsteering), for example approximately a hemisphere.

In general, the wireless transceivers 1, 64 may be operated:

A. For directional reception and re-transmission;

B. For non-directional reception and directional re-transmission; or

C. For directional reception and non-direction re-transmission,

In which the term "non-directional" refers to not applying deliberate phase-shifts for beamforming/beamsteering. In other words, any directionality in reception or transmission arise solely from the shapes of antennae $Rx_1$, . . . , $Rx_N$, $Tx_1$, . . . , $Tx_m$, and the geometries of the respective arrays, and so forth. The direction of relaying need not be limited to from the first antennae $Rx_1$, . . . , $Rx_N$ to the second antennae $Tx_1$, . . . , $Tx_M$, and the direction of relaying may be reversed, or may alternate with time.

The wireless transceivers 1, 64 may also change between the modes listed modes A, B and C at different times. Switching between modes may be according to a predetermined schedule, or may be dynamically determined in operation. Alternatively, a particular mode may be configured at a time of installation, depending on the role a given wireless transceivers 1, 64 is intended to fulfil in a wider communications network.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

What is claimed is:

1. A wireless transceiver configured to receive and retransmit radio signals within a time multiplexed wireless communications system, the wireless transceiver comprising:

a plurality of first antennae;

a plurality of second antennae; and a circuit connected to the plurality of first antennae and the plurality of second antennae, wherein the circuit is configured to:

control the plurality of first antennae as a first phased array to receive radio signals, the first phased array being directional and controllably orientable within a first range of angles;

control the plurality of second antennae as a second phased array to retransmit the radio signals received using the first phased array, the second phased array being directional and controllably orientable within a second range of angles; and only retransmit the radio signals responsive to the circuit identifying, using packet header data of the radio signals, a source of the radio signals as corresponding to one or more selected service providers.

2. The wireless transceiver of claim 1 further comprising a planar substrate having a first face and a second face, wherein:

the first antennae are supported on the first face and the first range of angles is a first range of acute angles to a normal of the first face;

the second antennae are supported on the second face and the second range of angles is a second range of acute angles to a normal of the second face; and the circuit is supported on or within the planar substrate.

3. The wireless transceiver of claim 2, wherein one or more of:

the circuit comprises one or more components supported on at least one of the first face or the second face; or the planar substrate comprises a laminate of two or more layers, and wherein the circuit comprises the one or more components supported within the laminate.

4. The wireless transceiver of claim 2, wherein the circuit comprises a first microstrip line supported on the first face and a second microstrip line supported on the second face, wherein the first microstrip line and the second microstrip line are connected by corresponding vias.

5. The wireless transceiver of claim 2, wherein the circuit comprises one or more components flip-chip bonded to the planar substrate.

6. The wireless transceiver of claim 2, further comprising:

a plurality of third antennae supported on the second face; and a plurality of fourth antennae supported on the first face, wherein the circuit is further configured to:

control the plurality of third antennae as a third phased array to receive corresponding radio signals, the third phased array being directional and controllably orientable within a third range of acute angles to the normal of the second face; and control the plurality of fourth antennae as a fourth phased array to retransmit the radio signals received using the third phased array, the fourth phased array being directional and controllably orientable within a fourth range of acute angles to the normal of the first face.

7. The wireless transceiver of claim 2, wherein at least one of a first antenna of the first plurality of antennae or a second antenna of the second plurality of antennae comprises a dielectric material having a corresponding loss-tangent which is less than a respective loss-tangent of the planar substrate.

8. The wireless transceiver of claim 1, wherein the circuit comprises an analog circuit configured for at least one of analog beamforming of the first phased array or analog beamsteering of the second phased array.

9. The wireless transceiver of claim 8, wherein:

the analog circuit comprises a first varactor diode corresponding to each first antenna of the first phased array;

each first varactor diode is configured to apply a phase shift to a signal received from a respective first antenna; and the circuit is configured to control the plurality of first antennae as the first phased array by controlling capacitances of the first varactor diodes.

10. The wireless transceiver of claim 8, wherein:

the analog circuit comprises a second varactor diode corresponding to each second antenna of the second phased array;

each second varactor diode is configured to apply a phase shift to a signal being transmitted to a respective second antenna; and the circuit is configured to control the plurality of second antennae as the second phased array by controlling capacitances of the second varactor diodes.

11. The wireless transceiver of claim 1, wherein:

the plurality of first antennae are arranged into a plurality of first sub-arrays, each first sub-array comprising two or more of the plurality of first antennae;

the plurality of second antennae are arranged into a plurality of second sub-arrays, each second sub-array comprising two or more of the plurality of second antennae; and the circuit is configured to perform at least one of hybrid beamforming or beamsteering.

12. The wireless transceiver of claim 11, wherein the circuit comprises:

a plurality of first analog circuits, each first analog circuit configured to perform analog beamforming on signals received from a respective first sub-array;

a plurality of second analog circuits, each second analog circuit configured to perform analog beamsteering for a respective second sub-array; and one or more digital circuits configured to:

perform digital beamforming on signals received from the first analog circuits to obtain a summed signal; and perform beam-steering on the summed signal to generate and output a plurality of transmit signals to respective second analog circuits.

13. The wireless transceiver of claim 1, wherein:

the circuit is configured, during a first period of an alternating cycle, to:

control the plurality of first antennae as the first phased array to receive the radio signals; and control the plurality of second antennae as the second phased array to retransmit the radio signals received using the first phased array; and the circuit is configured, during a second period of the alternating cycle, to:

control the plurality of second antennae as the second phased array to receive corresponding radio signals; and control the plurality of first antennae as the first phased array to retransmit the corresponding radio signals received using the second phased array.

14. The wireless transceiver of claim 1, wherein the circuit defines two or more passbands for receiving and retransmitting corresponding radio signals, and wherein the circuit is configurable such that one or more of the passbands may be disabled.

15. The wireless transceiver of claim 2, wherein:

a corresponding entire length of connections between the circuit and the plurality of first antennae is supported by a planar substrate; and a respective entire length of connections between the circuit and the plurality of second antennae is supported by the planar substrate.

16. A wireless transceiver configured to receive and retransmit radio signals within a time multiplexed wireless communications system, the wireless transceiver comprising:

a plurality of first antennae;

a plurality of second antennae; and a circuit connected to the plurality of first antennae and the plurality of second antennae, wherein the circuit is configured to:

control the plurality of first antennae to receive radio signals;

control the plurality of second antennae as a phased array to retransmit the radio signals received using the plurality of first antennae, the phased array being directional and controllably orientable within a range of angles; and only retransmit the radio signals responsive to the circuit identifying, using packet header data of the radio signals, a source of the radio signals as corresponding to one or more selected service providers.

* * * * *